(12) United States Patent
Staples

(10) Patent No.: US 11,780,520 B1
(45) Date of Patent: Oct. 10, 2023

(54) BICYCLE DROPPER SEAT POST ASSEMBLY WITH A NARROW GAS SPRING CARTRIDGE

(71) Applicant: D3 Innovation Inc., Squamish (CA)

(72) Inventor: Jonathan Staples, Garibaldi Highlands (CA)

(73) Assignee: D3 Innovation Inc., Squamish (CA)

( * ) Notice: Subject to any disclaimer, the term of this patent is extended or adjusted under 35 U.S.C. 154(b) by 0 days.

(21) Appl. No.: 17/959,267

(22) Filed: Oct. 3, 2022

Related U.S. Application Data

(60) Provisional application No. 63/329,444, filed on Apr. 10, 2022.

(51) Int. Cl.
    *B62J 1/06* (2006.01)

(52) U.S. Cl.
    CPC ....................... *B62J 1/06* (2013.01)

(58) Field of Classification Search
    CPC .......... B62J 1/08; B62J 2001/085; B62J 1/06; B62K 2201/08
    See application file for complete search history.

(56) References Cited

U.S. PATENT DOCUMENTS

| | | |
|---|---|---|
| 3,730,019 A | 5/1973 | Ballard |
| 4,354,398 A | 10/1982 | Porter |
| 4,421,357 A | 12/1983 | Shimano |
| 4,807,856 A | 2/1989 | Teckenbrock |
| 4,916,968 A | 4/1990 | Kabaya |
| 4,995,753 A | 2/1991 | Shook |
| 5,226,624 A | 7/1993 | Kingsbery |
| 5,244,301 A | 9/1993 | Kurke et al. |
| 5,466,042 A | 11/1995 | Herman |
| 5,649,738 A | 7/1997 | Thomson |
| 5,664,829 A | 9/1997 | Thomson |
| 5,722,718 A | 3/1998 | Still et al. |

(Continued)

FOREIGN PATENT DOCUMENTS

| | | |
|---|---|---|
| EP | 2657113 | 10/2013 |
| EP | 3196107 | 7/2017 |

(Continued)

OTHER PUBLICATIONS

Mad Suspension Manic Drop Post, information found onine at https://www.xfusionshox.com/products_detail/44.htm.

(Continued)

*Primary Examiner* — Sarah B McPartlin
(74) *Attorney, Agent, or Firm* — Kevin Shipley; Marks & Clerk

(57) ABSTRACT

A dropper post assembly for supporting a bicycle seat may have an outer tube and an inner tube having a clearance portion and an upper end that includes an inward facing axial stop surface that defines a laterally extending abutment plane. A spring cartridge assembly has a cartridge cross-sectional that is less than 90% of the interior cross-sectional area of the clearance portion. A lower engagement member is disposed toward a lower end of the inner tube and substantially fills a lateral between lower end of the cartridge tube and the inner tube. A post head member has a front fastening aperture, a lowermost part of which lies in a laterally extending post head plane that is disposed axially inboard from the abutment plane.

27 Claims, 16 Drawing Sheets

(56) References Cited

U.S. PATENT DOCUMENTS

| | | | |
|---|---|---|---|
| 5,829,733 | A | 11/1998 | Becker |
| 5,857,657 | A | 1/1999 | Yamamoto |
| 5,881,988 | A | 3/1999 | Liu |
| 5,899,530 | A | 5/1999 | Tdesco |
| 5,909,890 | A | 6/1999 | Sachs |
| 5,979,978 | A | 11/1999 | Olsen et al. |
| 6,220,582 | B1 | 4/2001 | Wandschneider |
| 6,276,756 | B1 | 8/2001 | Cho |
| 7,007,587 | B2 | 3/2006 | Zanden |
| 7,059,592 | B2 | 6/2006 | Huh |
| 7,083,180 | B2 | 8/2006 | Turner |
| 7,231,866 | B2 | 6/2007 | Seong |
| 7,721,640 | B2 | 5/2010 | Lee |
| 7,845,602 | B1 | 12/2010 | Young |
| 8,079,772 | B1 | 12/2011 | Brennan et al. |
| 8,167,373 | B2 | 5/2012 | Allison |
| 8,177,251 | B2 | 5/2012 | Shirai |
| 8,191,964 | B2 | 6/2012 | Hsu |
| 8,308,124 | B2 | 11/2012 | Hsu |
| 8,550,551 | B2 | 10/2013 | Shirai |
| 8,814,109 | B2 | 8/2014 | Laird et al. |
| 8,926,216 | B2 | 1/2015 | McAndrews |
| 9,073,592 | B2 | 7/2015 | Hsu |
| 9,688,331 | B1 | 6/2017 | Shirai |
| 9,878,753 | B2 | 1/2018 | Tsai |
| 9,969,448 | B1 | 5/2018 | Chen |
| 10,549,803 | B2 | 2/2020 | Shipman et al. |
| 10,787,215 | B1 | 9/2020 | Staples |
| 10,974,781 | B2 | 4/2021 | Staples |
| 11,180,212 | B2* | 11/2021 | Shirai ..................... F15B 15/16 |
| 11,447,201 | B2* | 9/2022 | Coaplen ................ B62K 23/06 |
| 2002/0185581 | A1 | 12/2002 | Trask |
| 2004/0065238 | A1 | 4/2004 | Chen |
| 2005/0067863 | A1 | 3/2005 | Roizen |
| 2006/0066074 | A1 | 3/2006 | Turner |
| 2006/0152045 | A1 | 7/2006 | Okajima et al. |
| 2007/0046081 | A1 | 3/2007 | Shook |
| 2007/0063554 | A1 | 3/2007 | Liao |
| 2007/0286671 | A1 | 12/2007 | Meggiolan |
| 2009/0066124 | A1 | 3/2009 | Pirovano |
| 2010/0052377 | A1 | 3/2010 | Hsu et al. |
| 2011/0097139 | A1 | 4/2011 | Hsu |
| 2011/0291446 | A1 | 12/2011 | Bourgeois |
| 2012/0098175 | A1 | 4/2012 | Wu |
| 2012/0181824 | A1 | 7/2012 | Hsu et al. |
| 2013/0269655 | A1 | 10/2013 | Yamazaki |
| 2014/0239682 | A1 | 8/2014 | Tisue |
| 2014/0305253 | A1 | 10/2014 | Tseng |
| 2015/0145294 | A1 | 5/2015 | Kench, III |
| 2015/0191208 | A1 | 7/2015 | Hsu |
| 2015/0232142 | A1 | 8/2015 | Shirai |
| 2015/0232158 | A1 | 8/2015 | Bouse et al. |
| 2017/0166275 | A1 | 6/2017 | McPherson et al. |
| 2017/0225731 | A1 | 8/2017 | Hsu |
| 2018/0015976 | A1 | 1/2018 | Hermansen et al. |
| 2018/0057087 | A1 | 3/2018 | Jhou et al. |
| 2018/0127041 | A1 | 5/2018 | Tsai |
| 2019/0263464 | A1* | 8/2019 | Staples ..................... B62J 1/08 |
| 2019/0283827 | A1 | 9/2019 | Shipman et al. |
| 2019/0300088 | A1 | 10/2019 | Jordan |
| 2019/0301497 | A1 | 10/2019 | Jordan |
| 2020/0023918 | A1 | 1/2020 | Shirai |
| 2020/0070913 | A1 | 3/2020 | Staples |
| 2020/0140029 | A1* | 5/2020 | Shipman ................ B62K 19/36 |
| 2021/0214031 | A1 | 7/2021 | Liao |
| 2022/0111919 | A1 | 4/2022 | Staples |
| 2022/0153371 | A1* | 5/2022 | Tung ..................... B62K 19/36 |

FOREIGN PATENT DOCUMENTS

| | | |
|---|---|---|
| FR | 2409182 | 6/1980 |
| TW | M517710 U | 5/2015 |
| TW | M513153 | 12/2015 |
| TW | I562922 | 12/2016 |
| TW | 201730032 | 9/2017 |
| TW | 201801969 | 1/2018 |
| TW | M562805 | 7/2018 |
| TW | M575784 | 3/2019 |
| WO | WO2016029301 | 3/2016 |

OTHER PUBLICATIONS

Fox Transfer Hydraulic Infinite Adjust Seat Post, information found online at https://www.ridefox.com/family.php?m=bike&family=seatpost.

KS Suspension LEV Intergra dropper post, information found online at https://www.kssuspension.com/product/lev-integra/.

9point8 the Fall Line dropper post, information found online at https://www.9point8.calindex.php?route=product/product&path=42&product_id=213.

Third party prior art submission made to German patent office dated Feb. 9, 2022 regarding related German application No. 10 2020 109 014.5.

Notice of third party opinion art submission made to TW IPO dated Sep. 1, 2021 in related ROC (Taiwan) Pat Appln No. 109111138.

Translation of Office action dated Mar. 3, 2022 in related ROC (Taiwan) Pat. Appln. No. 109111138.

Translation of Office action dated Nov. 17, 2021 in related ROC (Taiwan) Pat. Appln. No. 109111138.

Third Party Submission of Prior Art on Jan. 28, 2002 in related Canadian application No. 3,077,761.

Webpage entitled "Model: 2017 LEV/LEV 272" showing product specifications and figures of a bicycle seat tube provided by Kind Shock Hi-Tech Co., Ltd. and downloadable from the Wayback Machine at https://web.archive.org/web/20170610095807/kssuspension.com/wp-content/uploads/2016/12/2017-Lev-drawing.pdf, available at least as early as Jun. 10, 2017.

Webpage entitled "Model: LEV 272" showing an exploded view of a bicycle seat tube provided by Kind Shock Hi-Tech Co., Ltd. and downloadable from the Wayback Machine at https://web.archive.org/web/20170629100108/http://kssuspension.com/wp-content/uploads/2015/12/LEV-272.PDF, available at least as early as Jun. 10, 2017.

Contact SL Switch Seatpost. Online at <https://www.giant-bicycles.com/ca/contact-sl-switch-seatpost> 2019.

Crankbrothers Kronolog Adjustable Seat Post. Online at <https://www.pinkbike.com/news/Crankbrother-Kronolog-Adjustable-Seat-Post.html> 2019.

RASE Components, LLC Launches The Mamba Rapid Adjust Seatpost. Online at https://www.pinkbike.com/news/ rase-mamba-rapid-adjust-post-2008.html 2019.

2018 LEV dropper post drawings from Kind Shock Hi-Tech Co., dated Jan. 4, 2018.

* cited by examiner

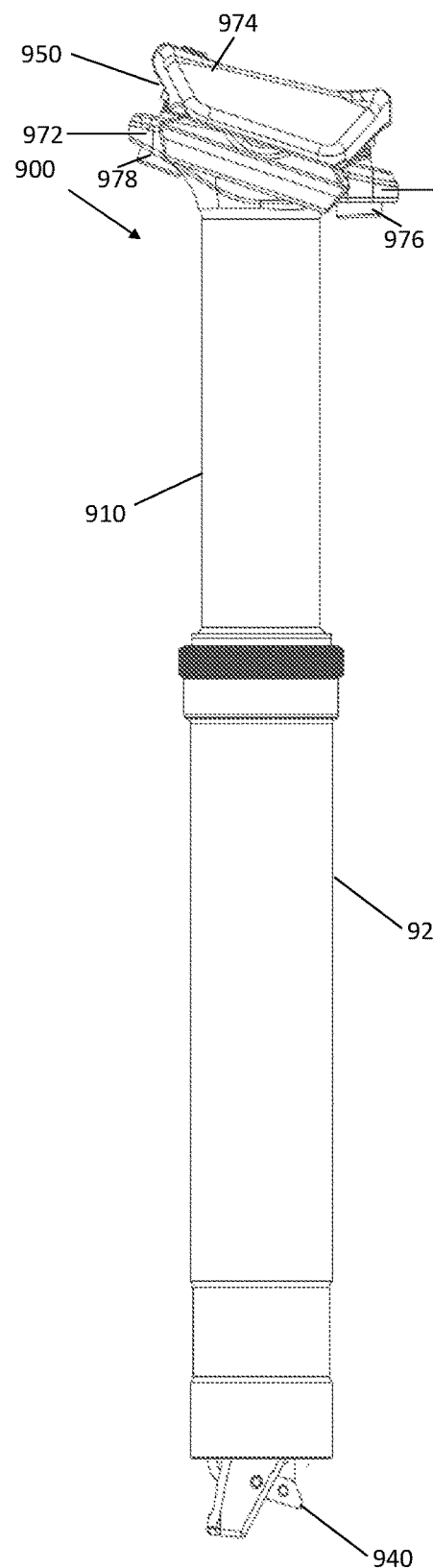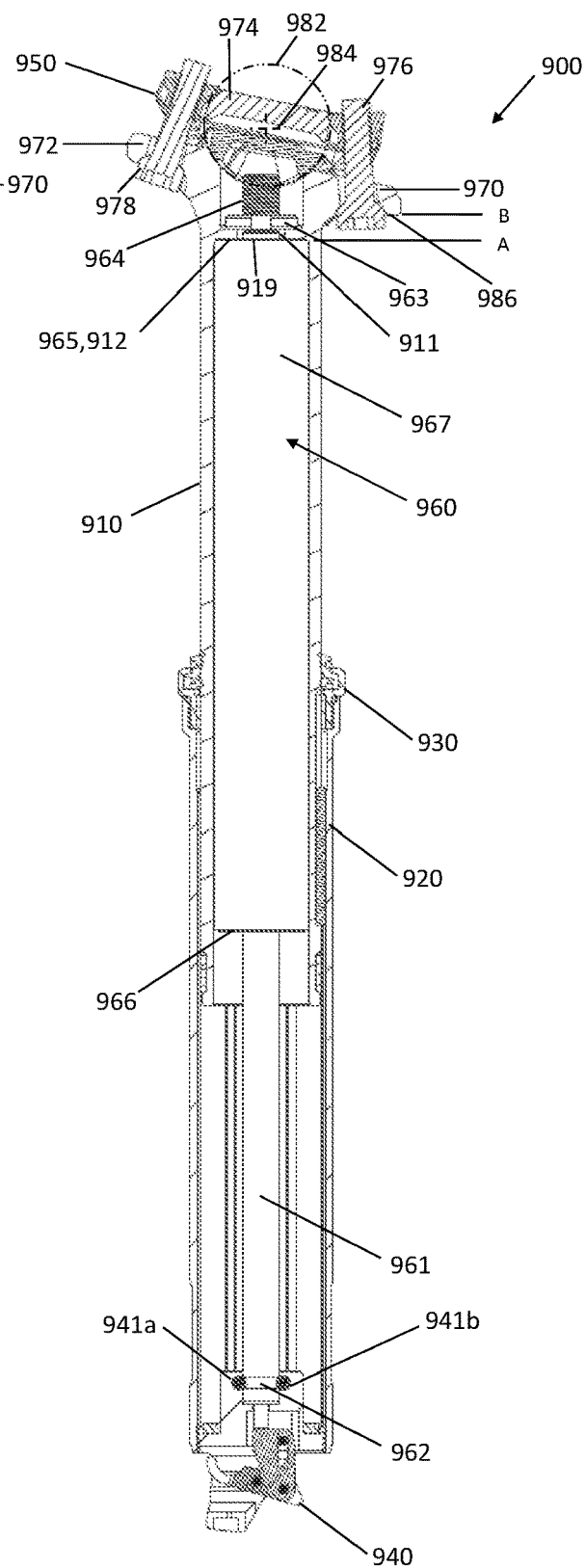
FIG 1.
Prior Art
FIG 2.
Prior Art

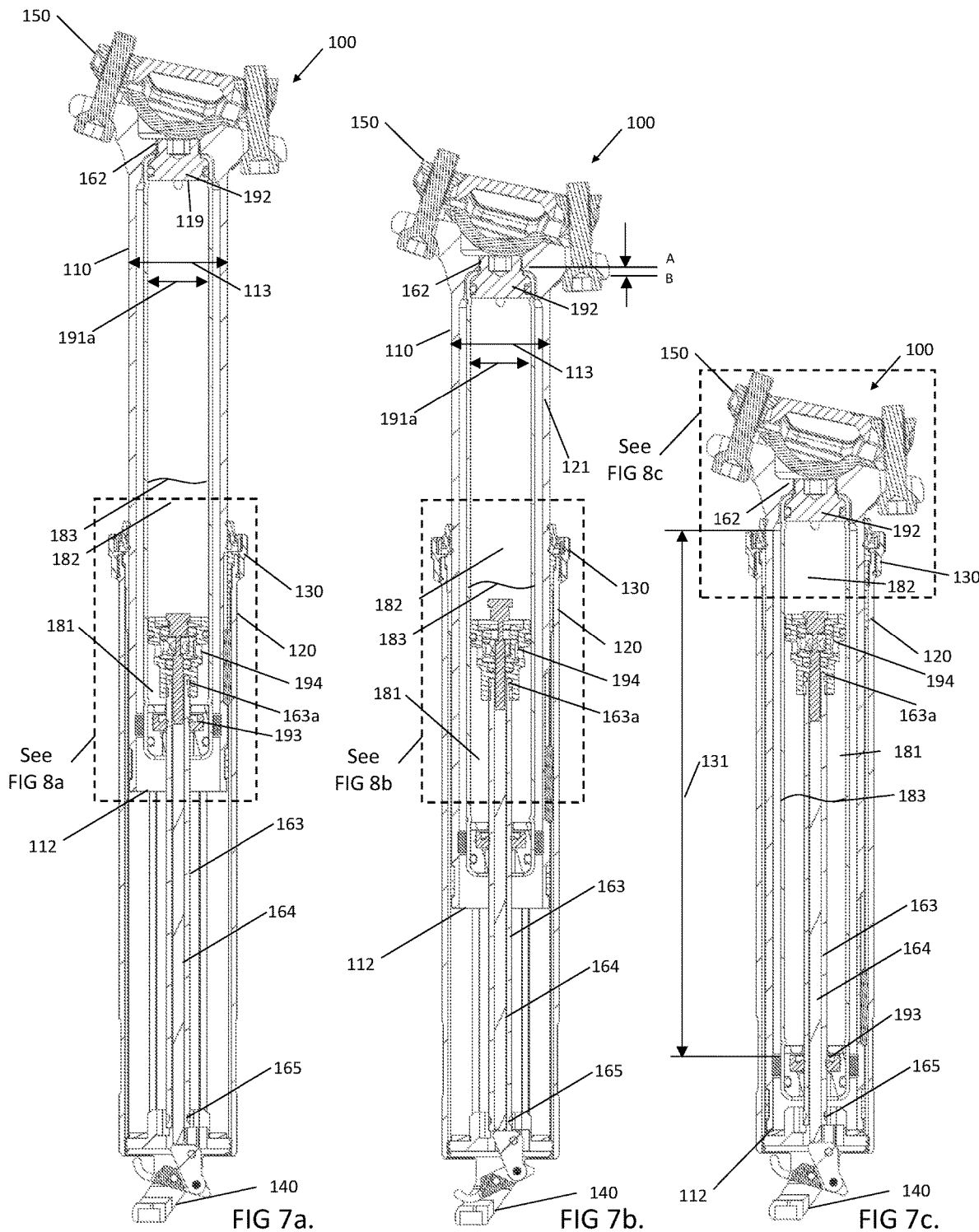

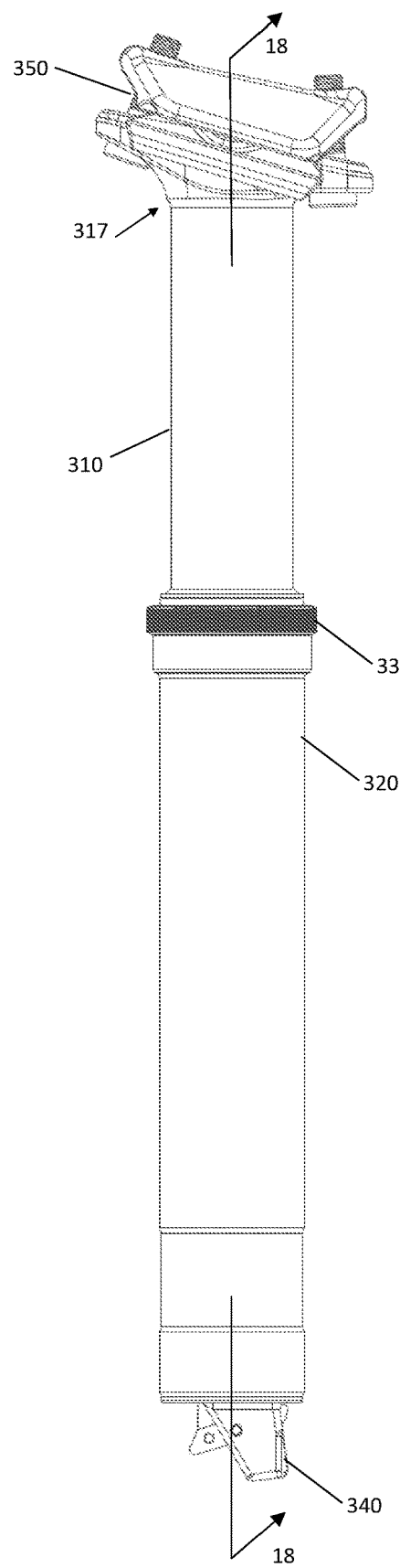
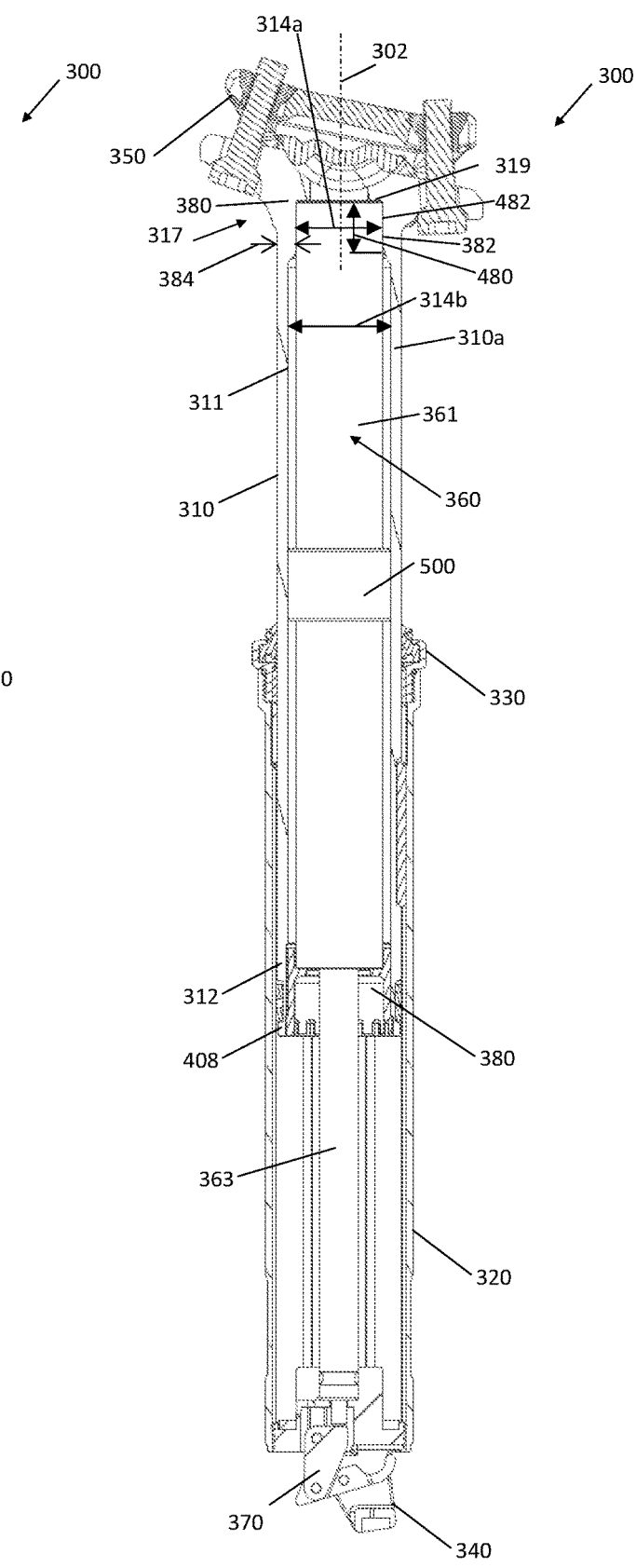
FIG 12.
FIG 13.

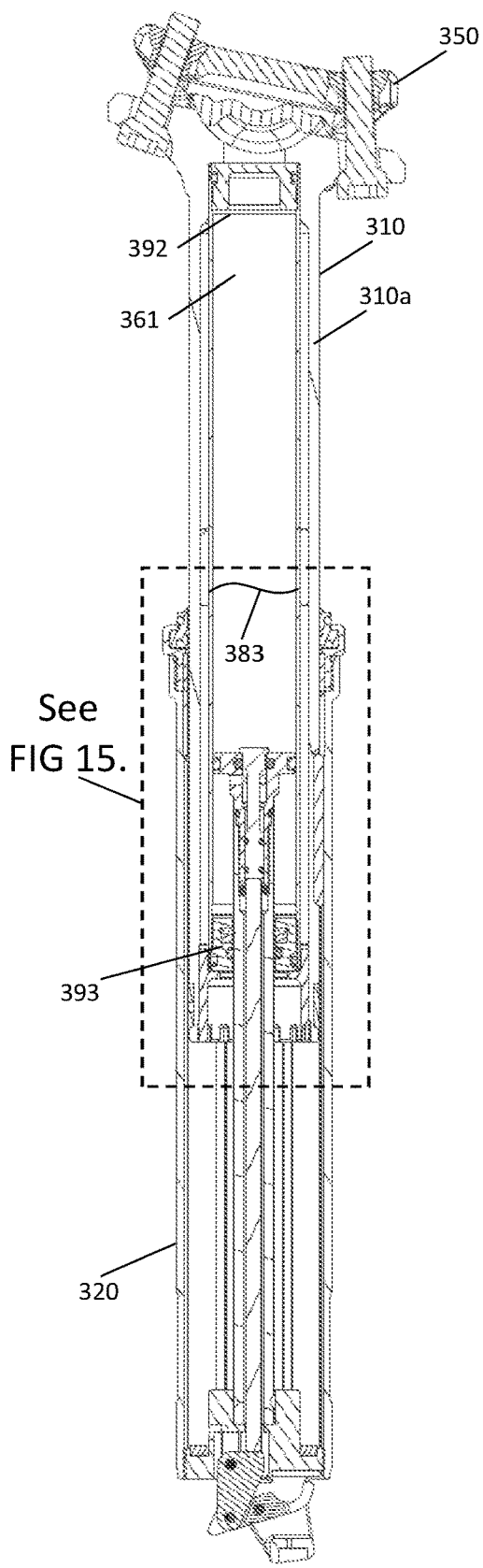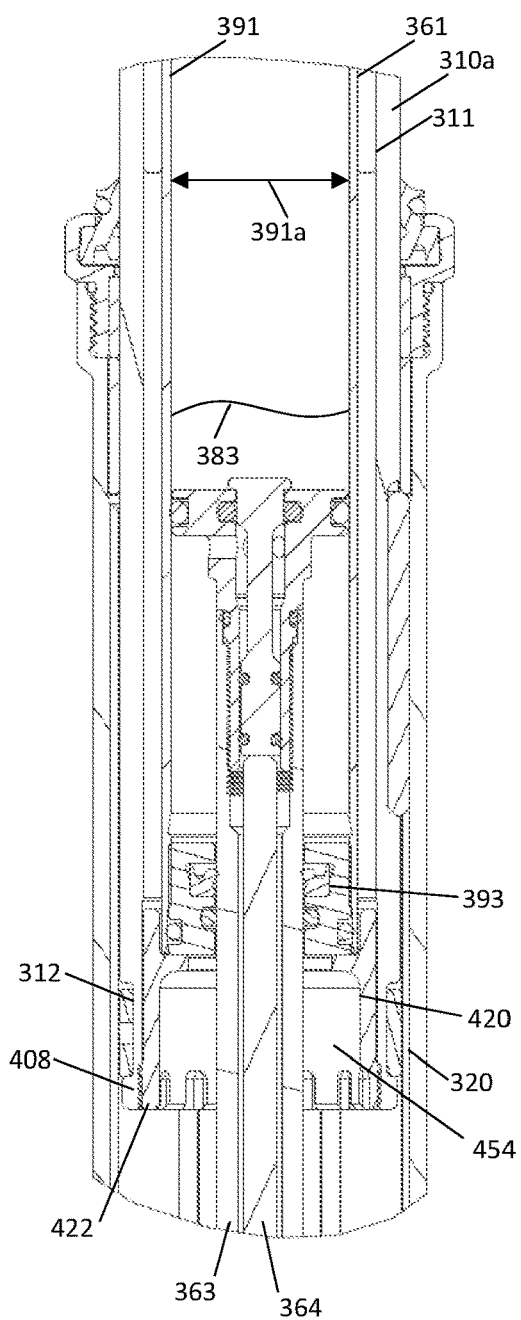
FIG 14.
FIG 15.

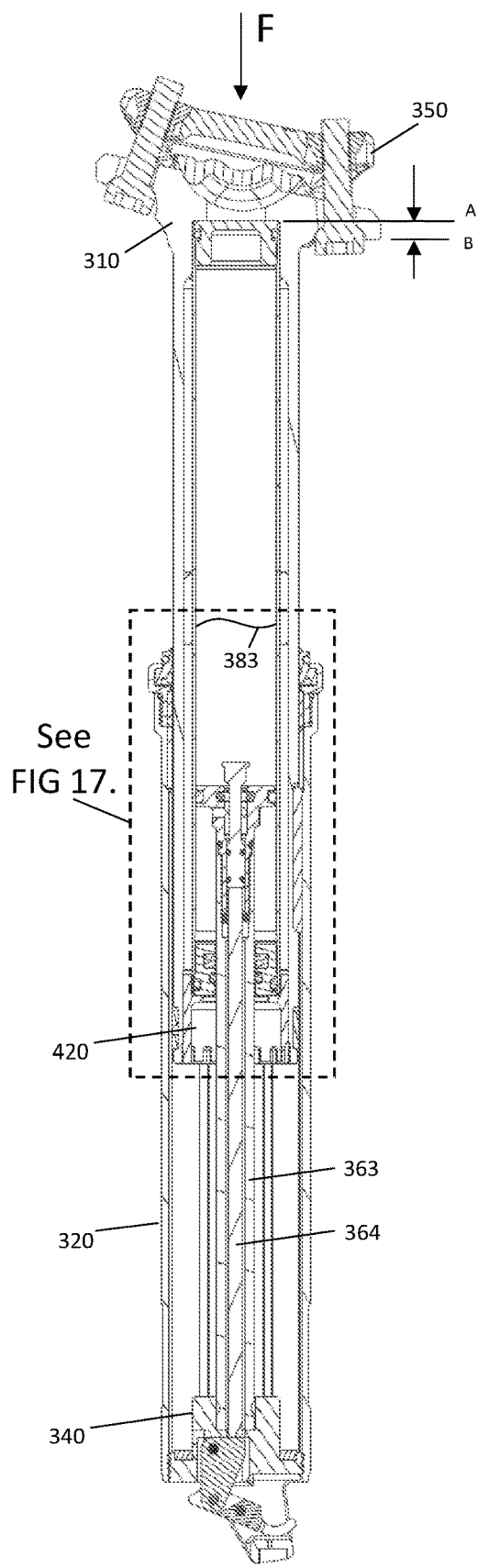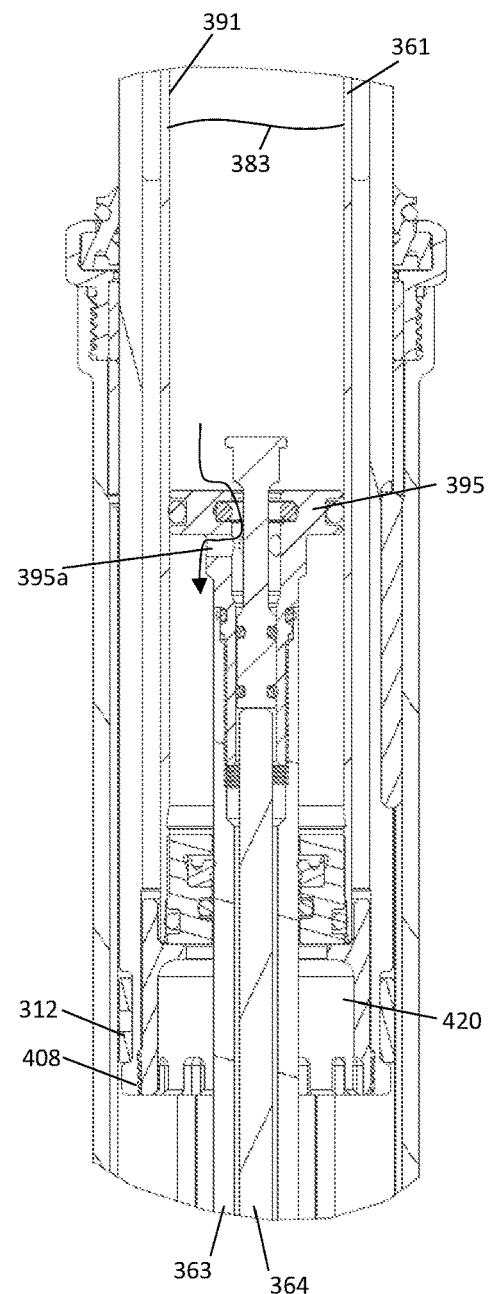
FIG 16.
FIG 17.

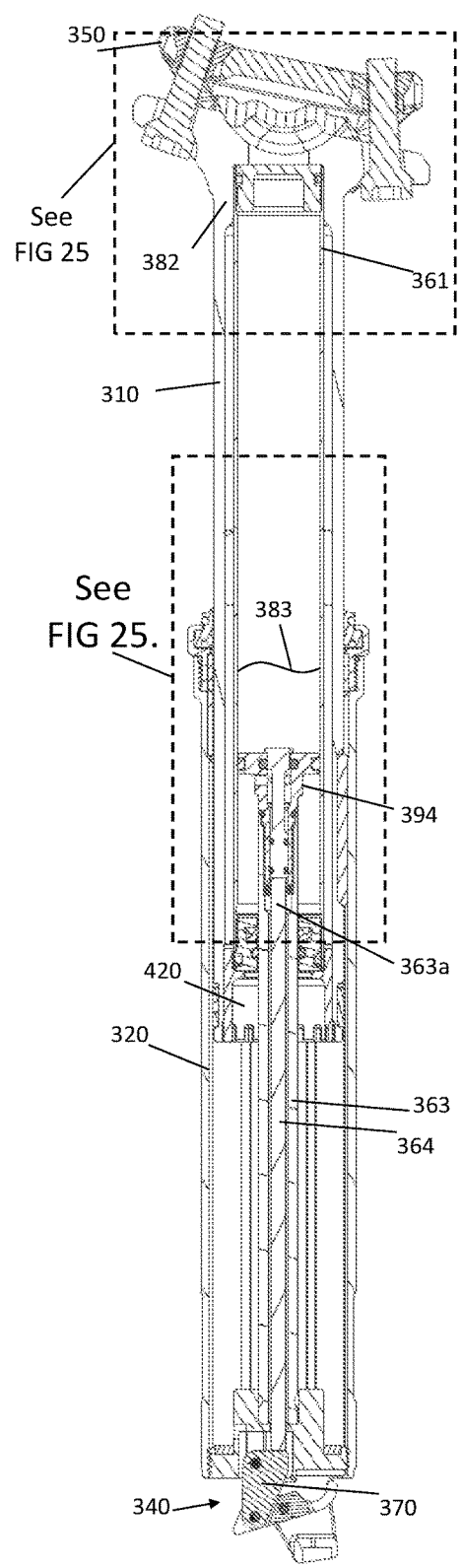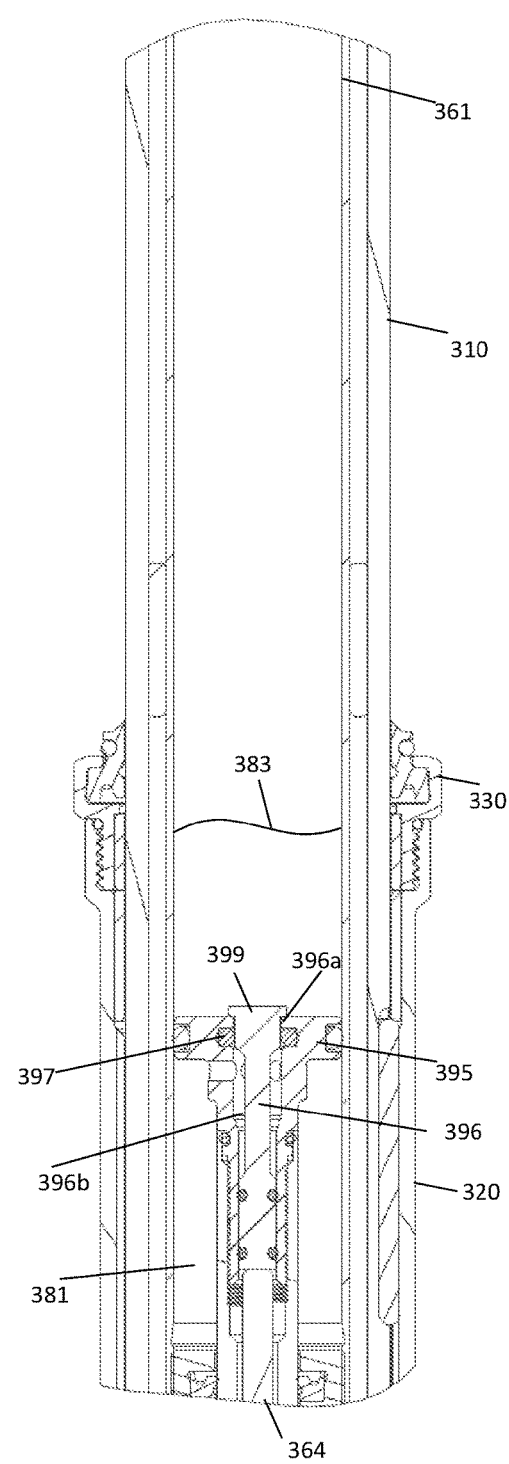
FIG 24.                    FIG 25.

BICYCLE DROPPER SEAT POST ASSEMBLY WITH A NARROW GAS SPRING CARTRIDGE

CROSS-REFERENCE TO RELATED APPLICATION(S)

The present application claims priority to and the benefit of U.S. provisional patent application No. 63/329,444, filed Apr. 10, 2022, and entitled Bicycle Dropper Seat Post Assembly with A Bottom Mounted Gas Spring Cartridge, the entirety of which is incorporated herein by reference.

TECHNICAL FIELD

The present disclosure relates to various embodiments of dropper post assemblies and locking spring cartridges used to control the height of a dropper seat post assembly on a bicycle. Some embodiments described herein can relate, more specifically to a dropper seat post assembly that can include a novel cartridge design having a relatively lower volume of oil and/or may relate to cartridge assemblies that have relatively small cross-sectional area.

INTRODUCTION

U.S. Pat. No. 5,881,988 discloses a seat assembly includes a seat tube in which a seat post is movably received therein which has a clamping member with a seat disposed thereto. The seat post has two plain portions defined diametrically opposite in an outer periphery thereof and the seat tube has two wedge-shaped recesses defined diametrically opposite in an inner periphery thereof so as to receive two wedge-shaped blocks therein. The seat post extends through a nut member which is threadedly mounted to the seat tube.

U.S. Patent Publication No. 2020/070913 discloses a bicycle seat post assembly in which the travel distance of the seat post can be adjusted. The seat post assembly includes an outer tube that is configured to telescopically receive an inner tube. The inner tube is axially slidable relative to the outer tube between a retracted position and an extended position, the extended position being determined by an extension assembly in which an inner contact member engages an outer contact member, thereby setting the upper limit of axial extension of the inner tube. The extension of the inner tube can be limited to an intermediate position that lies between the retracted and extended positions by an insertable shim that is positionable between the inner and outer contact members.

Taiwan patent publication no. TW201801969A discloses a casing gap filling structure for a bicycle seat tube, which comprises a casing set having an outer tube and an inner tube which are sleeved onto each other and move linearly; a rotation constraining set which is arranged between the inner tube and the outer tube and provided with a first constraining groove arranged on the inner diameter edge of the outer tube and a second constraining groove arranged on an outer diameter edge of the inner tube, the first and second constraining grooves forms a constraining space together, and at least one metal constraining member made of a metal material is accommodated in the constraining space and capable of conducting synchronous linear displacement with the inner tube; a gap filler set is disposed in the constraining space and provided with at least one plastic constraining member made of a plastic material, the gap filler set and the metal constraining member respectively overlapping with each other in the constraining space along the axial direction of the inner and outer tubes, and the plastic constraining member is able to effectively fill the constraining space so as to eliminate the gaps among the plastic constraining member and the first and second constraining grooves; in this way, the rotation constraining set and the gap filler set are used to achieve the dual function of constraining the rotation and eliminating the gaps between the inner tube and the outer tube at the same time. The manufacturing cost of the filling structure is low because the overall components are simple and easy to be assembled quickly. Further, the gaps among the components generated by the fit tolerance and the manufacturing tolerance are reduced with no requirement of tight rotation actions, the automatic filling function is thus achieved and compatible with the lifting seat tube and the suspension seat tube.

U.S. Pat. No. 10,974,781 discloses a bicycle seat post assembly in which the travel distance of the seat post can be adjusted. The seat post assembly includes an outer tube that is configured to telescopically receive an inner tube. The inner tube is axially slidable relative to the outer tube between a retracted position and an extension position, the extension position being determined by an extension assembly in which a slider engages an upper retainer surface, thereby setting the upper limit of axial extension of the inner tube. The extension of the inner tube can be limited to an intermediary extension position that lies between the retracted and extension positions by an insertable extension stopper that is positionable under the upper retainer surface.

Taiwan utility model publication no. TWM517710U discloses a bicycle gas hydraulic seat tube assembly related to bicycles, especially a bicycle hydraulic pressure seat tube assembly. The common gas-oil seat tube adopts the gas compressible characteristic to match the flow of hydraulic oil in the space, so that the relative position change between the seat tube and the seat post is achieved, thereby achieving the effect of adjusting the height of the seat cushion. For example, as disclosed in the Republic of China Announcement No. M332057, the upper and lower displacements of the valve stem are used to switch the flow state of the adjustment flow path, so that the seat tube can achieve the effect of adjusting the height. However, in the aforementioned patent case, the inner and outer spaces for storing the hydraulic oil are disposed between the relatively exposed seat tube and the adjustment seat and are not located in the relatively closed riser. The risk of leakage is therefore necessary for structural improvements. The main purpose of this creation is to provide a bicycle gas pressure seat tube assembly that reduces the risk of oil and gas leakage.

Taiwan utility model publication no. TWM513153 shows a post in which a lifting adjustment unit 40 is housed inside seat post 30 and secured by threadedly engaging lower end cap 48 to the lower end of seat post 30. An external air chamber 60 is formed between seat post 30 and tube body 49 that is in fluid communication with internal air chamber 66 via lower air holes. External air chamber 60 can further fluidly communicate with an air valve on upper end cover 47 via upper air hole 472. Both lower end cap 48 and upper end cap 47 are o-ring sealed to seat tube 30 so that air pressure held in external air chamber 60 and internal air chamber 66 cannot escape to atmosphere. As such if lifting adjustment unit 40 is removed from and reinstalled into seat post 30, by unthreading lower end cap 48, the gas pressure would be lost, and the system would need to be recharged via the air valve on upper end cap 47.

SUMMARY

Dropper seat posts are telescopic posts that allow the rider to change the height of their seat without having to stop and adjust a mechanically tightened seat post collar. It can be generally advantageous to lower the bicycle seat as far as possible when riding through technical terrain to allow the rider to change body position or bend their knees deeply without contacting the seat. These dropper seat posts can include two or more tube sections that are movable relative to each other and can utilize an actuator, such as a locking spring cartridge, that can be used to trigger the movement of the post between its retracted and extended configurations, and/or lock the post in a desired position.

Some known dropper post locking spring cartridges are configured with two or more chambers containing liquid (i.e., hydraulic oil), gas (i.e., air) or a combination thereof. There is typically an internal piston valve controlled by an actuator/remote and an actuation rod translatable between an open and a closed position. When the piston valve is closed and a rider sits on a seat attached to the top of the post, the chamber containing, by design, only oil is placed in compression thereby allowing the post to be loaded without retracting.

In this configuration, when the piston valve is opened the piston travels into the oil only chamber. Because the oil in the oil only chamber is substantially incompressible it is typically more difficult to open the valve while the upper tube is being urged toward the retracted position. This causes the rider to have to exert more force on the actuator/remote than may be comfortable, and/or that may put unwanted loads on the actuator system, in order to overcome this resistance and open the valve.

In this configuration, if the rider sits down on the seat too fast/hard while the piston valve is locked (closed), for example if a rider were to have one or both feet slip off the pedals and fall onto the seat with substantially all of their body weight, the seat post would generally not retract and therefore the seat would not move/lower to absorb and the rider could be injured by the seat and/or cause damage to the dropper post or seat.

Also, in this configuration air can sometimes enter the oil only chamber unintentionally. Once there, the presence of the relatively compressible air/gas within the chamber that is intended to contain only oil/liquid may allow the post to compress slightly under a relatively low force while the piston valve is, and remains, locked. This relatively low force sponginess is seen by consumers as being generally undesirable and as an indicator of a low-quality design, and a generally expensive and/or complicated rebuild is required to fix the problem.

Accordingly, there remains for a dropper post, including a suitable spring cartridge device, in which the actuation force of the spring cartridge device is not materially affected by the instantaneous load that is being applied to the seat (e.g. can operate in substantially the same way when the seat is loaded or unloaded), and where, when the piston valve is closed, the upper tube remains sufficiently rigid to resist loading of the seat up to a pre-determined, overload force above which the post can compress slightly, in accordance with its cushion quotient, to help protect the post from damage and/or the rider from injury.

The foregoing examples of the related art and limitations related thereto are intended to be illustrative and not exclusive. Other limitations of the related art will become apparent to those of skill in the art upon a reading of the specification and a study of the drawings. The teachings described herein may help address one or more of these known limitations of the related art or may provide other advantages that are not related to these specific limitations.

The following embodiments and aspects thereof are described and illustrated in conjunction with systems, tools, and methods which are meant to be exemplary and illustrative, not limiting in scope. In various embodiments, one or more of the above-described problems have been reduced or eliminated, while other embodiments are directed to other improvements.

One aspect of the embodiments described herein provides a dropper post assembly for supporting a bicycle seat, the dropper post assembly comprising an outer tube extending along a post axis between a lower end and an upper end; an inner tube telescopically receivable in the outer tube and extending between an upper end that is connectable to a bicycle seat and a lower end that is disposed within the outer tube, the inner tube being axially slidable within the outer tube between a retracted position in which the lower end of the inner tube is proximate the lower end of the outer tube and an extended position in which the lower end of the inner tube is axially spaced from the lower end of the outer tube.

One broad aspect of the embodiments described herein provides a dropper post assembly with a locking spring cartridge including an axially extending cylinder a piston disposed within the cylinder, a first chamber containing oil only on a lower side of the piston, a second chamber on an opposing, upper side of the piston which, as described in more detail herein, is configured to contain a combination of oil and gas when the dropper post is in the extended position and which may contain only gas when the dropper post is in a retracted position and a valve that is configurable in an open position in which fluid communication is established between the first chamber and second chamber and a closed position in which the first chamber is fluidly isolated from the second chamber; the cartridge may be configured so that moving the inner tube toward the retracted position expands the first chamber In accordance with another broad aspect of the teachings herein, that may be used alone or in combination with other aspects, a dropper post assembly for supporting a bicycle seat can include an outer tube extending along a post axis between a lower end and an upper end comprising a seat collar. An inner tube may have an upper end that is connectable to a bicycle seat and a lower end that is axially spaced from the upper end and is disposed within the outer tube, and may be configured to be axially slidable within the outer tube by a travel distance that is at least 70 mm between a retracted position in which the lower end of the inner tube is proximate the lower end of the outer tube and an extended position in which the lower end of the inner tube is axially spaced from the lower end of the outer tube. The inner tube may have an outer diameter that is between 20 mm and 30 mm. A spring cartridge may include an axially extending cylinder disposed within the upper tube and a piston movably received within the cylinder. An actuator may have a body disposed at the lower end of the outer tube and may be operable to change the spring cartridge between the locked configuration and the unlocked configuration.

The cylinder may include an inward facing sliding surface and the piston may slidably seal against the sliding surface thereby dividing the cylinder to provide a first chamber on one side of the piston (below the piston when the dropper post is in use) and a second chamber on the other side of the piston (above the piston when the dropper post is in use), whereby moving the inner tube toward the retracted position expands the first chamber. The interior of the cylinder contains a liquid (such as oil) and a gas (such as air), and the two fluids can meet at a liquid/gas interface or boundary at a location within the cylinder. The cartridge is preferably configured so that when the dropper post is extended the first chamber contains only liquid and the liquid/gas boundary is located in the second chamber which contains both liquid and gas, and that when dropper post is in the retracted position the upper chamber contains substantially only gas and liquid/gas boundary is located within the first chamber which contains both gas and liquid.

The second chamber may contain a combination of the liquid and a gas when the dropper post is extended and operates at a pressure that is between about 500 psi and about 900 psi when the dropper post is approaching or reaches full extension.

The spring cartridge may include a cartridge rod extending from the piston through the first chamber, and a valve that is configurable in an open position in which fluid communication is established between the first chamber and second chamber and the cartridge is in the unlocked configuration, and a closed position in which the first chamber is fluidly isolated from the second chamber and the cartridge is in the locked configuration. An actuation rod may extend from the body of the actuator and through the cartridge rod to the valve and operable to selectably open and close the valve.

The sliding surface defines a sliding surface diameter ($D_s$) may be between about 12 mm and about 25 mm and the cartridge rod may have a cartridge rod diameter ($D_R$).

The cartridge rod diameter may be between about 5 mm and about 9 mm.

The valve may include a valve body formed in the piston and a plunger that seals against the valve body when the valve is in the closed position and that is translatable relative to the valve body and into the second chamber to change the valve to the open position. A plunging force required to translate the plunger relative to the valve body may be substantially constant regardless of the axial position or loading of the inner tube.

The plunging force required when the inner tube is subjected to an axial load may be within about 10% of the plunging force required to translate the plunger relative to the valve body is when the inner tube is unloaded.

The cylinder may be integrally formed with the inner tube, whereby the inner tube comprises the sliding surface.

The cylinder may include an outer cartridge tube that is disposed within and is connected to translate with the upper tube.

In accordance with one broad aspect of the teachings herein a dropper post assembly for supporting a bicycle seat comprises an outer tube extending axially along a post axis between a lower end and an upper end; an inner tube axially slidable relative to the outer tube between an extended position and a retracted position and extending axially between an upper end that is connectable to a bicycle seat and a lower end that is disposed within the outer tube; a spring cartridge configurable in an unlocked configuration in which the spring cartridge biases the inner tube toward its extended position and a locked configuration, and comprising: an axially extending cylinder disposed within and slidable with the inner tube and having an interior containing a combination of a liquid and a gas and having a sliding surface; a piston with a sealing portion slidably sealing against the sliding surface thereby dividing the cylinder interior to provide a first chamber disposed between the piston and a lower end of the cylinder and a second chamber disposed between the piston and an upper end of the cylinder whereby moving the inner tube toward the retracted position expands the first chamber; and an actuator having a body disposed at the lower end of the outer tube and operable to change the spring cartridge between the locked configuration and the unlocked configuration; wherein, when the inner tube is in the extended position the sealing portion (of the piston) is at least partially submerged in the liquid, the second chamber contains a layer of the gas above a layer of the liquid and the first chamber contains the liquid, and when the inner tube is in the retracted position the first chamber contains the liquid and a layer of gas between the liquid and the sealing portion whereby the sealing portion (of the piston) is not in contact with the liquid.

When the inner tube is in the retracted position the second chamber may contain the gas and is substantially free of the liquid.

When the inner tube is in the retracted position the sealing portion may be surrounded by the gas.

When the inner tube is in the extended position the sealing portion may be completely submerged in the liquid.

The gas and the liquid contained within the cylinder interior may meet at a gas/liquid interface, and wherein when the inner tube is in the extended position the gas/liquid interface may be disposed in the second chamber, and when the inner tube is in the retracted position the gas/liquid interface may be disposed in the first chamber.

When the inner tube moves from the extended position to the retracted position the sealing portion may pass through the gas/liquid interface, whereby when the inner tube is in the extended position the gas/liquid interface may be on a first side of the sealing portion and when the inner tube is in the retracted position the gas/liquid interface may be on another side of the sealing portion.

When the inner tube is in the retracted position the first chamber may define a retracted volume, and wherein a volume of liquid contained within the cylinder may be less than the retracted volume.

The volume of liquid contained within the cylinder may be between 10-50% of the retracted volume.

During a first drop segment, as the inner tube begins to retract, the sealing portion may be submerged in the liquid.

During a second drop segment the sealing portion may cross the gas/liquid interface and moves through the gas.

After the second drop segment the sealing portion may be surrounded by the gas.

During the first drop segment the inner tube may retract at a first speed, and during the second drop segment the inner tube may retract at a second speed, wherein the first speed is slower than the second speed.

During the first drop segment the piston may experience a first resistance to movement, and during the second drop segment the piston may experience a second resistance to movement, wherein the second resistance to movement is less than the first resistance to movement.

The sealing portion may be beyond the gas/liquid interface by at least 10% of a length of the inner tube when retracted.

The spring cartridge may comprise a cartridge rod extending from the piston through the first chamber, and a valve that is configurable in an open position in which fluid communication is established between the first chamber and second chamber and the cartridge is in the unlocked configuration, and a closed position in which liquid and/or gas cannot pass through the valve so the first chamber and second chamber are isolated from each other and the cartridge is in the locked configuration, and further comprising an actuation rod extending from the body of the actuator and through the cartridge rod to the valve and operable to selectably open and close the valve.

When extended, opening the valve may provide fluid communication between oil on both sides of the piston, and when retracted, opening the valve may provide fluid communication between gas on both sides of the piston.

The gas may be at an operating pressure that is above about 200 psi.

The cylinder may be integrally formed with the inner tube, whereby the inner tube comprises the sliding surface.

The cylinder may comprise an outer cartridge tube that is disposed within and is connected to translate with the inner tube.

In accordance with one broad aspect of the teachings herein a dropper post assembly for supporting a bicycle seat comprises: a) an outer tube extending axially along a post axis between a lower end and an upper end; b) an inner tube axially slidable relative to the outer tube between an extended position and a retracted position and extending axially between an upper end that is connectable to a bicycle seat and a lower end that is disposed within the outer tube; c) a spring cartridge configurable in an unlocked configuration in which the spring cartridge biases the inner tube toward its extended position and a locked configuration, and comprising: i. an axially extending cylinder disposed within and slidable with the inner tube and having an interior containing a combination of a liquid and a gas and having a sliding surface; ii. a piston with a sealing portion slidably sealing against the sliding surface thereby dividing the cylinder interior to provide a first chamber disposed between the piston and a lower end of the cylinder and a second chamber disposed between the piston and an upper end of the cylinder whereby moving the inner tube toward the retracted position expands the first chamber; and d) an actuator having a body disposed at the lower end of the outer tube and operable to change the spring cartridge between the locked configuration and the unlocked configuration; the gas and the liquid contained within the cylinder interior meet at a gas/liquid interface, and wherein when the inner tube is in the extended position the gas/liquid interface is disposed in the second chamber and the cartridge has a first internal pressure, and when the inner tube is in the retracted position the gas/liquid interface is disposed in the first chamber is disposed in the first chamber and the cartridge has a second internal pressure that is less than 130% of the first internal pressure.

In view of some of the shortcomings of the known dropper posts, including those known designs referred to herein, there remains a general desire for a sealed locking spring cartridge that can be used in a dropper post assembly and that can be installed or removed without requiring the removal of the seat clamps. This may allow the spring cartridge to be serviced, replaced or otherwise accesses without requiring the removal of the seat clamps and the seat any seat that is attached.

There also remains a general desire for a sealed locking spring cartridge that can be constrained to the lower end of the seat post inner tube rather than the upper end of the seat post inner tube, and preferably regardless of the relative difference between the seatpost inner tube inner diameter and the cartridge outer tube outer diameter. This could allow the sidewalls of the seat post inner tube to be modified to help achieve other desirable functions/attributes (such as increased strength or reduced weight) without requiring significant modification or redesign of the spring cartridge. This could help allow a common spring cartridge to be used with two or more different seatpost inner tube designs.

There also remains a general desire for a sealed locking spring cartridge that does not require a threaded hole or protrusion at the top end of the seatpost inner tube. This can help facilitate the use of closed-top seatpost inner tube. Using a closed-top seatpost inner tube may help simply manufacturing of the seatpost inner tube, may modify its strength or other parameters and/or may help provide a more sealed arrangement that can prevent dirt or other debris from getting into the interior of the seatpost inner tube via the opening that would otherwise be required to accommodate the upper fastener on conventional spring cartridges.

There also remains a general desire for a sealed locking spring cartridge that can be removed and reinstalled into the seatpost inner tube without having the recharge the gas pressure in the system. This can simplify and the maintenance and/or assembly of the dropper post assemblies and may allow portions of the dropper post assembly to be serviced by a user and/or without the need for specialized tools and equipment that could be required to open a pressurized spring cartridge and/or recharge the cartridge once installed.

There also remains a general desire for a sealed locking spring cartridge having a smaller volume of liquid/hydraulic oil. This may allow for a standardized size of sealed locking spring cartridge to be manufactured, and reduce the overall weight of the dropper post There is also a general desire for a sealed locking spring cartridge having a smaller volume of liquid/hydraulic oil where the oil/gas boundary moves from one side of the piston (e.g., above) at full extension to the opposing side of the piston (e.g., below) at an intermediary travel position, which can preferably be <50% of the total post travel distance when the cartridge is oriented with the rod pointed down There is also a general desire for a sealed locking spring cartridge having a smaller volume of liquid/hydraulic oil but where oil is always adjacent the actuator rod sliding seal, which is generally located at the lower end of the cartridge when the dropper post is installed on a bicycle.

In accordance with another broad aspect of the teachings described herein, that may be used in combination with other aspects or independently, a dropper post assembly for supporting a bicycle seat may include an outer tube extending axially along a post axis between a lower end and an upper end and an inner tube that is axially translatable relative to the outer tube between an extended position and a retracted position. The inner tube may have an interior bounded by a sidewall with a clearance portion disposed axially between an upper end that includes an inward facing axial stop surface and a lower end that is disposed within the outer tube. The clearance portion may have an interior cross-sectional area taken in a lateral direction that is perpendicular to the post axis, and wherein a lowermost portion of the axial stop surface lies in a laterally extending abutment plane. A spring cartridge assembly may be configurable in an unlocked configuration in which the spring cartridge assembly biases the inner tube toward its extended position and a locked configuration and may include a cartridge tube removably disposed within and axially translatable with the inner tube relative to the outer tube and providing an interior cylinder volume bounded by a cartridge sidewall. The cartridge tube may have an upper end positioned proximate the axial stop surface and secured to the upper end of the inner tube such that relative lateral movement between the upper end of the cartridge tube and the upper end of the inner tube is inhibited and a lower end that is disposed at the lower end of the inner tube. The cartridge tube may have a cartridge cross-sectional area taken in the lateral direction that is less than 90% of the interior cross-sectional area whereby a lateral gap is provided between at least some of the cartridge sidewall and the clearance portion. A piston may be movably received within the cylinder to provide a first chamber disposed on a lower side of the piston, and a second chamber disposed on an opposing, upper side of the piston, whereby moving the inner tube toward the retracted position expands the first chamber. The piston may include a valve that is configurable in an open position in which fluid communication is established between the first chamber and the second chamber and the spring cartridge assembly is in the unlocked configuration, and a closed position in which the first chamber is fluidly isolated from the second chamber and the spring cartridge assembly is in the locked configuration. A lower seal assembly may be disposed at a lower end of the cartridge tube and may seal a lower end of the cylinder and a cartridge rod may extend axially through the lower seal assembly between an inner end engaging the piston and an outer lower end at the lower end the outer tube. An actuator assembly may have a body disposed adjacent the outer end of the cartridge rod and being operable to actuate the valve to change the spring cartridge assembly between the locked configuration and the unlocked configuration. A post head member may be disposed at the upper end of the inner tube for attaching a bicycle seat. The post head member may have a front mounting portion projecting forwardly beyond a perimeter of the inner tube sidewall and having a front fastener aperture wherein a lowermost part of the front fastener aperture may lie in a laterally extending post head plane that is disposed axially inboard from the abutment plane.

The dropper post assembly may include comprising a seat clamp assembly mounted to the post head member for attaching the bicycle seat and a front fastener extending through the front fastener aperture and securing the seat clamp assembly to the post head member. A lowermost part of the front fastener may lie in a laterally extending fastener plane that is disposed axially inboard from the abutment plane.

The post head member may include a curved cradle surface configured to rotatably support a seat clamp assembly and may define a seat rotation perimeter and a seat rotation axis. The abutment plane and an uppermost portion of the cartridge tube assembly may be disposed axially inboard from the seat rotation axis.

The cartridge tube may include an axially facing upper cap surface that is proximate the axial stop surface when the cartridge tube is disposed within the inner tube and the upper cap surface and axial stop surface may be complimentary to each other and generally planar.

The uppermost portion of the cartridge tube assembly may be disposed axially between the seat rotation axis and the seat rotation perimeter.

The upper most portion of the cartridge tube assembly may be disposed axially inboard from the seat rotation perimeter.

The clearance portion may have a length that extends at least 30% of an axial length of the inner tube.

A bumper may be positioned laterally between the clearance portion and the cartridge sidewall within the lateral gap thereby inhibiting lateral movement of the clearance portion relative to the inner tube. The bumper may have a length in the axial direction that is less than 20% of the cartridge tube length.

The upper end of the cartridge tube may be sealed and the cartridge tube and the lower seal assembly may be removable together from the inner tube whereby the first chamber and second chamber remain sealed when the cartridge tube is removed from the inner tube and cartridge assembly remains operable independently of the inner tube.

The inner tube may include an upper captive portion having a captive cross-sectional area taken in the lateral direction and wherein the cartridge cross-sectional area is more than 90% of the captive cross-sectional area so that the upper end of the cartridge tube is closely received in the upper captive portion thereby inhibiting lateral movement between the upper end of the cartridge tube and the upper end of the inner tube.

The upper end of the cartridge tube may not be connected to the upper end of the inner tube in a manner that prevents axial removal of the upper end of the cartridge tube from the upper captive portion.

The upper end of the inner tube may include an upper tube engagement member and the cartridge tube comprises an axial engagement member that is removably connected to upper tube engagement member to axially secure the cartridge tube to the inner tube.

The upper tube engagement member may include a first threaded portion of the inner tube and the axial engagement member comprises a complimentary second threaded portion whereby the cartridge tube threadingly engages the inner tube.

A lower engagement member may be disposed toward the lower end of the inner tube and substantially filling the lateral gap thereby inhibiting relative lateral movement between the lower end of the cartridge tube and the inner tube.

In accordance with another broad aspect of the teachings described herein, that may be used alone or in combination with any other aspects, a dropper post assembly for supporting a bicycle seat may include an outer tube extending axially along a post axis between a lower end and an upper end, and an inner tube that is axially translatable relative to the outer tube between an extended position and a retracted position. The inner tube may have an interior bounded by a sidewall having a clearance portion disposed axially between an upper end and a lower end that is disposed within the outer tube, the clearance portion having an interior cross-sectional area taken in a lateral direction that is perpendicular to the post axis. A spring cartridge assembly may be configurable in an unlocked configuration in which the spring cartridge assembly biases the inner tube toward its extended position and a locked configuration, and may include a cartridge tube removably disposed within and axially translatable with the inner tube relative to the outer tube and providing an interior cylinder volume bounded by a cartridge sidewall. The cartridge tube may have an upper end secured to the upper end of the inner tube such that relative lateral movement between the upper end of the cartridge tube and the upper end of the inner tube is inhibited and a lower end that is disposed at the lower end of the inner tube. The cartridge tube may have a cartridge cross-sectional area taken in the lateral direction that is less than 90% of the interior cross-sectional area whereby a lateral gap is provided between at least some of the cartridge sidewall and the clearance portion. A piston may be movably received within the cylinder to provide a first chamber disposed on a lower side of the piston, and a second chamber disposed on an opposing, upper side of the piston. Moving the inner tube toward the retracted position may expands the first chamber. The piston may include a valve that is configurable in an open position in which fluid communication is established between the first chamber and the second chamber and the spring cartridge assembly is in the unlocked configuration, and a closed position in which the first chamber is fluidly isolated from the second chamber and the spring cartridge assembly is in the locked configuration. A lower seal assembly may be disposed at a lower end of the cartridge tube and may seal a lower end of the cylinder and a cartridge rod may extend axially through the lower seal assembly between an inner end engaging the piston and an outer lower end at the lower end the outer tube. An actuator assembly may have a body disposed adjacent the outer end of the cartridge rod and being operable to actuate the valve to change the spring cartridge assembly between the locked configuration and the unlocked configuration. A post head member may be disposed at the upper end of the inner tube for attaching a bicycle seat. A lower engagement member may be disposed toward the lower end of the inner tube and substantially filling the lateral gap thereby inhibiting relative lateral movement between the lower end of the cartridge tube and the inner tube.

The engagement member may be axially insertable into the lower end of the inner tube or is integrally formed with the inner tube.

The lower engagement member may be disposed entirely within the interior of the inner tube.

The cartridge tube may be axially translatable relative to the lower engagement member and is axially insertable into and removable from the inner tube while the lower engagement member is installed.

The lower engagement member may include a clip that is partially received within a complimentary groove formed in the inner tube sidewall.

The lower end of the inner tube may include a lower tube engagement member and wherein the lower engagement member may include a second engagement member configured to releasably engage the lower tube engagement member and an axially extending captive sidewall whereby when the lower engagement member is inserted the captive sidewall is disposed laterally between the lower end of the cartridge tube and the inner tube sidewall.

The lower engagement member may include a lower abutment surface. When the lower engagement member is inserted with the second engagement member engaging the lower tube engagement member the cartridge tube may be retained axially between the lower abutment surface and the axial stop surface, whereby relative axial movement between the cartridge tube and the inner tube is inhibited.

The captive sidewall may extend axially from the abutment surface and may cooperate with the abutment surface to at least partially define a tube recess sized to accommodate the lower end of the cartridge tube. When the lower engagement member is inserted the lower end of the cartridge tube may be nested within the tube recess.

The upper end of the cartridge tube may not include a fastening mechanism for restricting the axial movement of the cartridge tube relative to the inner tube.

The lower tube engagement member and the second engagement member may include complimentary threads.

The upper end of the inner tube may include an inward facing axial stop surface and a lowermost portion of the axial stop surface lies in a laterally extending abutment plane. The post head member may include a front mounting portion projecting forwardly beyond a perimeter of the inner tube sidewall and having a front fastener aperture wherein a lowermost part of the front fastener aperture lies in a laterally extending post head plane that is disposed axially inboard from the abutment plane.

The cartridge cross-sectional area may be less than 85% of the interior cross-sectional area.

In accordance with another broad aspect of the teachings herein, that may be used alone or in combination with other aspects, a dropper post assembly for supporting a bicycle seat, may include an outer tube extending axially along a post axis between a lower end and an upper end and an inner tube that is axially translatable relative to the outer tube between an extended position and a retracted position. The inner tube may have an interior bounded by a sidewall with a clearance portion disposed axially between an upper end that includes an inward facing axial stop surface and a lower end that is disposed within the outer tube. The clearance portion may have an interior cross-sectional area taken in a lateral direction that is perpendicular to the post axis. A lowermost portion of the axial stop surface may lie in a laterally extending abutment plane. A spring cartridge assembly may be configurable in an unlocked configuration in which the spring cartridge assembly biases the inner tube toward its extended position and a locked configuration and may include a cartridge tube removably disposed within and axially translatable with the inner tube relative to the outer tube and providing an interior cylinder volume bounded by a cartridge sidewall. The cartridge tube may have an upper end positioned proximate the axial stop surface and a lower end that is disposed at the lower end of the inner tube. The cartridge tube may have a cartridge cross-sectional area taken in the lateral direction that is less than 90% of the interior cross-sectional area whereby a lateral gap is provided between at least some of the cartridge sidewall and the clearance portion. A piston may be movably received within the cylinder to provide a first chamber disposed on a lower side of the piston, and a second chamber disposed on an opposing, upper side of the piston, whereby moving the inner tube toward the retracted position expands the first chamber, the piston including a valve that is configurable in an open position in which fluid communication is established between the first chamber and the second chamber and the spring cartridge assembly is in the unlocked configuration, and a closed position in which the first chamber is fluidly isolated from the second chamber and the spring cartridge assembly is in the locked configuration. A lower seal assembly may be disposed at a lower end of the cartridge tube and sealing a lower end of the cylinder and a cartridge rod extending axially through the lower seal assembly between an inner end engaging the piston and an outer lower end at the lower end the outer tube. An actuator assembly may have a body disposed adjacent the outer end of the cartridge rod and being operable to actuate the valve to change the spring cartridge assembly between the locked configuration and the unlocked configuration. A lower engagement member may be disposed toward the lower end of the inner tube and may substantially fill the lateral gap thereby inhibiting relative lateral movement between the lower end of the cartridge tube and the inner tube. A post head member may be disposed at the upper end of the inner tube for attaching a bicycle seat, the post head member having a front mounting portion projecting forwardly beyond a perimeter of the inner tube sidewall and a lowermost part of the front mounting portion lies in a laterally extending post head plane that is disposed axially inboard from the abutment plane.

The upper end of the cartridge tube may be secured to the upper end of the inner tube such that relative lateral movement between the upper end of the cartridge tube and the upper end of the inner tube is inhibited.

BRIEF DESCRIPTION OF THE DRAWINGS

FIG. 1 is a side view of one example of a dropper post known in the art.

FIG. 2 is a cross-sectional view of the dropper post of FIG. 1.

FIG. 7a is a cross-sectional view of the dropper post of FIG. 4, taken along line 4-4, with the dropper post extended;

FIG. 7b is a cross-sectional view of the dropper post of FIG. 4, taken along line 4-4, with the dropper post partially retracted;

FIG. 7c is a cross-sectional view of the dropper post of FIG. 4, taken along line 4-4, with the dropper post retracted;

FIG. 12 is a side view of another example of a dropper post assembly;

FIG. 13 is a partial section view of the dropper post assembly of FIG. 12, taken along line 18-18 to reveal the interior of the post inner tube and post outer tube;

FIG. 14 is a further section view of the dropper post assembly of FIG. 12, revealing the interior of the locking gas spring cartridge;

FIG. 15 is an enlarged view of a portion of FIG. 14;

FIG. 16 is a further section view of the dropper post assembly of FIG. 12, revealing the interior of the locking gas spring cartridge in a different configuration;

FIG. 17 is an enlarged view of a portion of FIG. 16;

FIG. 24 is a partial cross-section view of a dropper post assembly in a locked configuration;

FIG. 25 is an enlarged view of a portion of FIG. 24;

DESCRIPTION

Figure 3:
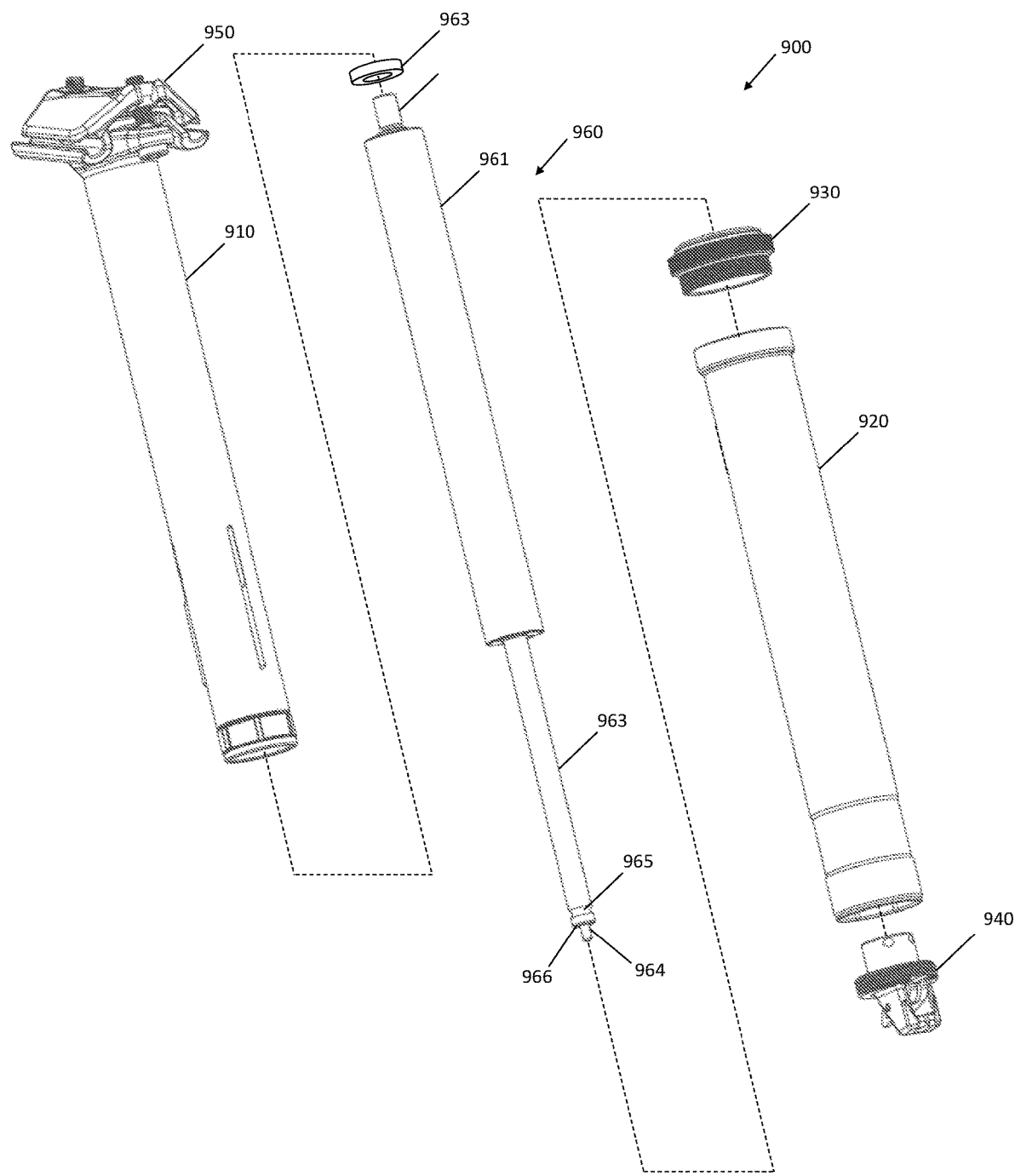
FIG. 3 is an exploded view of the dropper post of FIG. 1.
Figure 4:
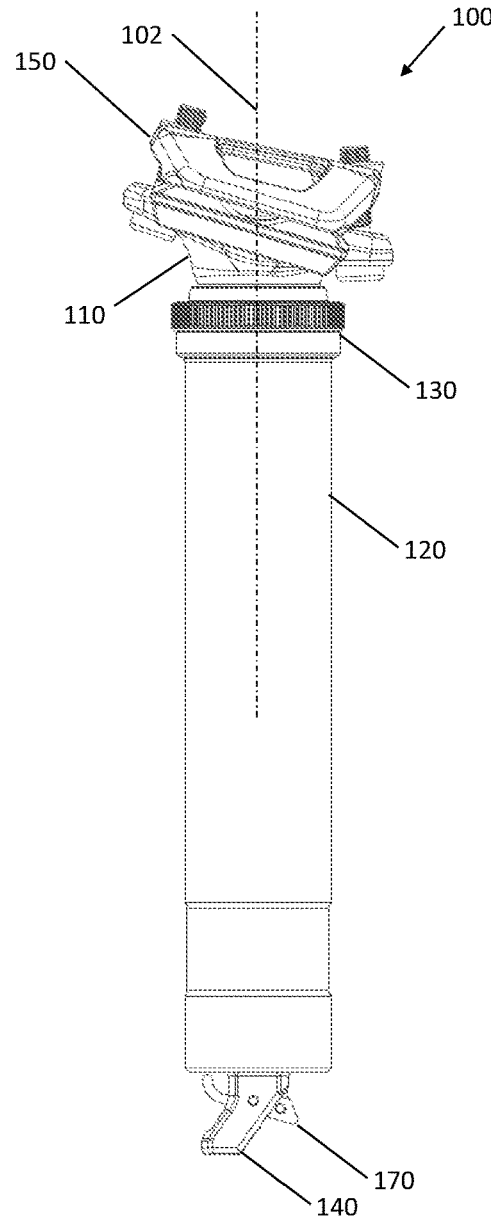
FIG. 4 is a side view of one example of a dropper post in a retracted position.

Various apparatuses or processes will be described below to provide an example of an embodiment of each claimed invention. No embodiment described below limits any claimed invention and any claimed invention may cover processes or apparatuses that differ from those described below. The claimed inventions are not limited to apparatuses or processes having all of the features of any one apparatus, embodiment or process described below or to features common to multiple or all of the apparatuses described below. It is possible that an apparatus or process described below is not an embodiment of any claimed invention. Any invention disclosed in an apparatus or process described below that is not claimed in this document may be the subject matter of another protective instrument, for example, a continuing patent application, and the applicants, inventors or owners do not intend to abandon, disclaim, or dedicate to the public any such invention by its disclosure in this document.

Bicycle dropper seat posts allow a rider to change the height of their seat while riding without having to stop and adjust a mechanically tightened seat post collar. Dropper seat posts are available in different sizes, having different lengths of travel and different minimum and maximum seat heights. The dropper posts can include a lower or outer tube that can be connected to a bicycle, and an upper or inner tube that is telescopically slidable relative to the outer tube. A bicycle seat is connectable to the upper end of the inner tube, using a suitable clamping mechanism, and the lower end of the inner tube is usually nested within the outer tube. The inner tube is movable, relative to the outer tube, between a retracted position (in which the seat is relatively closer to the bicycle and most of the inner tube is received within the outer tube) and at least one extended position (in which the seat is relatively farther from the bicycle and a significant portion of the inner tube is exposed and extended outside the outer tube).

To help facilitate the desired extension and retraction of the inner tube, dropper seat posts can also include a biasing and locking mechanism that can be used to urge/bias the inner tube toward at least one of the retracted or extended positions, and can also help secure the inner tube in place—such as in its extended position—if the rider wishes to keep the seat at a given height/position. Preferably, the biasing and locking mechanism can be arranged to bias the inner tube (and seat mounted thereon) to its extended position, and then maintain the inner tube in this position until the rider chooses to have the inner tube retracted. In the embodiments described below, the biasing and locking mechanism includes a locking spring cartridge.

Preferably, the dropper seat posts also include some type of actuator mechanism that a rider can use to actuate/trigger the biasing and locking mechanism, so as to allow the rider to selectably alter the seat height. For example, the dropper seat post can include an actuator assembly that is used to trigger and/or selectable lock and unlock the locking spring cartridge. The locking spring cartridge, as described herein, can be configured so that it remains fixed/lock when not engage by the actuator assembly, and will stay in either its extended or retracted position. The locking spring cartridge is preferably biased toward its extended position, whereby if the locking spring cartridge is retracted and is then unlocked by the rider via the actuator, the locking spring cartridge can apply a biasing, extension force that urges the inner tube (and seat) toward its extended position—thereby raising the seat. With the actuator disengaged, the locking spring cartridge is considered locked and will resist movement/retraction of the inner tube. That is, the locking spring cartridge force will resist the axial/vertical loads on the inner tube while in use to help keep the seat at the desired height, but the resistance of the locking spring cartridge may be overcome if a sufficiently large axial/vertical force is applied. Allowing the locking spring cartridge to yield in response to an overload situation (e.g. when the applied force passes a predetermined load threshold), while remaining sufficiently rigid when subjected to loads below the predetermine load/yield threshold may be advantageous because it can allow the post to support the weight of the rider when in use (in a manner that is perceived to be stable by the rider), while allowing the post to yield when overloaded to avoid damaging or bending portions of the post or injuring the rider. Having a cushion quotient, Qc, that is sufficiently high can help achieve this desired performance.

When a rider wishes to lower the seat height, the actuator is engaged, and the rider can apply a downward force on the seat (typically using their body weight) that is sufficient to overcome the biasing force of the locking spring cartridge so that the inner tube can be retracted into the outer tube. Once retracted, the actuator is disengaged, thereby locking the locking spring cartridge and keeping the inner tube in its retracted position. In this arrangement, the biasing force of the locking spring cartridge when unlocked is preferably set relatively low so that the inner tube can be retracted using the body weight of the rider (and of riders of potentially different sizes and weights), whereas the force required to cause movement of the locking spring cartridge when it is locked is relatively higher, but below the predetermined threshold.

To make things convenient for the rider, the triggering mechanism/remote for the actuator assembly can be provided at another location on the bicycle, such as on the handlebars, and can be operatively connected to an actuator assembly by a remote connector (such as a wire, cable, chain, lever, pneumatic or hydraulic link or the like). Because such remotes are usually connected to the actuator assembly in a mechanical/fluid power manner that transmits forces back to the user, it is preferable that the force required to engage the actuator assembly remains in a range that is feasible/comfortable for the rider to apply using the remote, and more preferably the force required to engage the actuator assembly remains relatively constant whether the inner tube is extended or retracted. This may help provide a more consistent tactile experience for the rider.

The inventor has determined that the extension force, overload yield force and other parameters of the dropper post can be configured by modifying aspects of the locking spring cartridge design, such that a new dropper post has been created in which the actuation force of the spring cartridge device is not materially affected by the instantaneous load that is being applied to the seat (e.g. can operate in substantially the same way when the seat is loaded or unloaded), and/or where, when the spring cartridge is locked (e.g. the piston valve is closed), the upper tube can remain sufficiently rigid to resist loading of the seat up to a pre-determined, overload force above which the post can compress slightly to help protect the post from damage and/or the rider from injury. Examples of suitable locking spring cartridges that can be used in such dropper posts are described herein.

FIGS. 1 to 3 are prior art and show an example of a dropper post 900 available in the market. FIG. 2 is a cross-sectional view of the dropper post 900 shown in FIG. 1, having an outer tube 920, collar 930 and an inner tube 910 in which a spring cartridge 960 is mounted in a manner that is known in the prior art shows an example of prior art. In this configuration, threaded protrusion 964 of the upper end 965 of cartridge 960 extends through aperture 911 of seat post inner tube 910. Nut or lockring 963 may be used to interface with threaded protrusion 964 of the upper end 965 of cartridge 960. Cartridge upper end 965 is thereby pulled into contact with flange 912 of tube 910. Groove 962 of rod 961 interfaces with fasteners 941a and 941b to fixedly attach rod 961 to actuator 940.

In this illustrated example the cartridge outer tube 967 and rod 961 are not rotationally fixed to each other about their respective, longitudinal axes (the vertical direction as illustrated in FIG. 2). Cartridge upper tube 967 and threaded protrusion 964 that are part of the cartridge 960 may tend to rotate relative to the inner tube 910, including when trying to tighten or loosen the nut 963. With other portions of the cartridge 960, including specifically the cartridge outer tube 967, being generally inaccessible to the user during this process it can be quite difficult to tighten or loosen the nut 963 because a user cannot easily hold the cartridge outer tube 967 in a fixed position (i.e. it will tend to rotate with the nut 963), even if the user were to hold rod 961 because rotation of the rod 961 relative to the cartridge outer tube 967 is possible.

Referring to FIG. 2, the upper end 965 of the cartridge 960 forms an abutment surface 919 that abuts the inner tube 910 axially. The lowermost portion of the axial stop surface 919 lies in a laterally extending abutment plane A.

The seat attachment assembly 950 comprises a post head member 970, a lower seat clamp 972, a complementary upper seat clamp 974, and two fasteners 976/978, such as bolts. The post head member 970 comprises a cradle portion 980 forming at least part of its upper surface (i.e., a surface that is generally upwardly facing when the bicycle is in use) that is configured to engage with a complimentary bearing surface on the lower seat clamp 972. The cradle portion 980 can be any shape that allows for a given embodiment of the lower seat clamp 972 to engage with and rest on the cradle portion 980. The cradle portion 980 can be configured to help facilitate relative pivoting/rotation of other portions of the seat attachment assembly 950, such as the lower seat clamp 972 and upper seat clamp 974, to help accommodate a generally forward/rearward tilting of the bicycle seat relative to the inner tube 910 to suit a rider/user's preferences. In the illustrated embodiment, the cradle portion 980 forms part of a rotation perimeter 982, that is centered around the pivot axis 984. The radius of curvature of the rotation perimeter 984 is defined by the radius of curvature of the cradle portion 980.

The post head member has a front mounting portion 986 that projects forwardly beyond a perimeter of the inner tube 910 side wall, and the lowermost part of the front mounting portion 986 lies in a laterally extending post head plane B. The post head plane B is disposed axially above the abutment plane A. The threaded protrusion 964 that is a part of the cartridge 960 extends upwardly into the defined rotational perimeter 982 of the seat clamp assembly 950.

FIG. 3 provides an exploded diagram of the components of the dropper post 900. In this illustrated example it is very difficult, if not impossible to access the nut 963 with appropriate tools or the hands of a user when the seat clamps 950 (and a seat thereon) are installed as shown in FIG. 2. Accordingly, in this illustrated example the nut 963 can only be practically accessed by removing seat clamps 950.

In this illustrated example the lower end 966 of cartridge outer tube 967 is not constrained or fixed relative to the inner surface of the inner tube 910. As such, if the inner diameter of inner tube 910 and the outer diameter of cartridge upper tube 967 are not selected to be substantially the same size there can be an increased risk of cartridge 960 buckling or rattling within inner tube 910 while the seat post 900 is in use. This condition may lead to the seat post inner tube 930, cartridge outer tube 967 or both needing to be designed to be heavier than required in order to reduce the gap between their respective diameters as described herein.

FIGS. 4 to 8*c* illustrate one example of a dropper seat post 100 includes an inner tube 110, seat clamps 150 (for connecting to a bicycle seat—not shown), an outer tube 120, a seat collar 130, an actuator assembly 140, including actuator mechanism 170, and a locking spring cartridge tube 160. In this arrangement, both the inner tube 110 and outer tube 120 are elongate, tubular members that extend along a post axis 102. While the post axis 102 is shown as generally vertical in FIGS. 1 and 2, when the dropper post 100 is installed on a bicycle the post axis may be inclined and need not be vertical.

Figure 5:
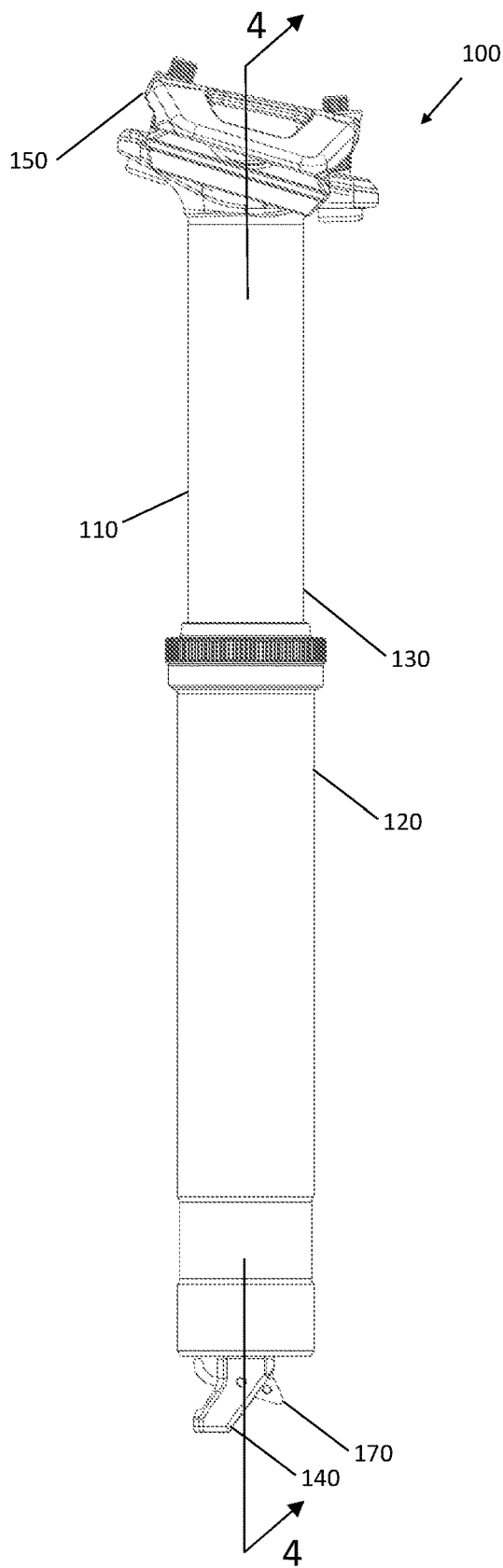
FIG. 5 is a side view of the dropper post of FIG. 4 in an extended position.

In this example, the inner tube 110 is configured to slide telescopically within the outer tube 120 between a retracted position (FIG. 4) and an extended position (FIGS. 5 and 7*a*, for example). The inner tube 110 includes a lower end 112 that is sized to fit within the outer tube 120 and that is intended to be retained within the outer tube 120 in both of the seat post's 100 retracted (FIG. 4) and extended configurations (FIG. 5). The inner tube 110 also has a sidewall with a clearance portion 121 that defines an inner wall surface 111 and defines an inner tube outer diameter 113 and inner tube inner diameter 114. While the term inner tube diameter is used for convenience in this description, it is possible in some examples that the inner wall does not have a circular cross-sectional shape, and may have an oval shape, rectangular shape or other suitable shape, even if the outer shape is circular or substantially circular. As described herein, the interior of the upper tube is preferably sized to accommodate the associated spring cartridge (as described herein). Therefore, references to inner diameters can be understood to mean inner width and/or other relevant interior measurement. The term diameter is not intended to limit the present teachings to only be applicable to posts with a circular interior shape.

Referring to FIGS. 6 to 9, one example of a locking spring cartridge 160 that is suitable for use with the dropper posts described herein includes a cartridge outer tube 161 that has a sidewall with an inner surface that can be engaged by portions of the cartridge and can form part of the boundary of internal cartridge chambers and/or may be part of the sealing structures. In this example, the inner surface of the cartridge outer tube 161 can be referred to as an inner sliding surface 191 that defines a sliding surface diameter 191*a*. The cartridge outer tube 161 is preferably connectable to the inner tube 110 in a manner that is sufficiently strong enough to carry the forces described herein, and that allows the inner tube 110 to move with the cartridge outer tube 161. In the illustrated example, the cartridge outer tube 161 includes upper connection portion 162 with optional threads 162*a* and tool interface 162*b* for attaching cartridge 160 to upper tube 110, although other fasteners could be used. In addition to the cartridge outer tube 161, the locking spring cartridge 160 also includes a cartridge rod 163 with a cartridge rod diameter 163*a*, a locking groove 165 at a lower end 166 of the cartridge rod 163, and an actuation rod 164. Fixedly attached to sliding surface 191 are upper seal head 192 and lower seal head 193, which together help seal in the interior of the cartridge outer tube 161 and substantially fluidly isolate the interior of the cartridge outer tube 161 from the surrounding environment (at least with a sufficient degree of sealing/isolation to facilitate the operation of the locking spring cartridge 160 as described herein).

Figure 6:
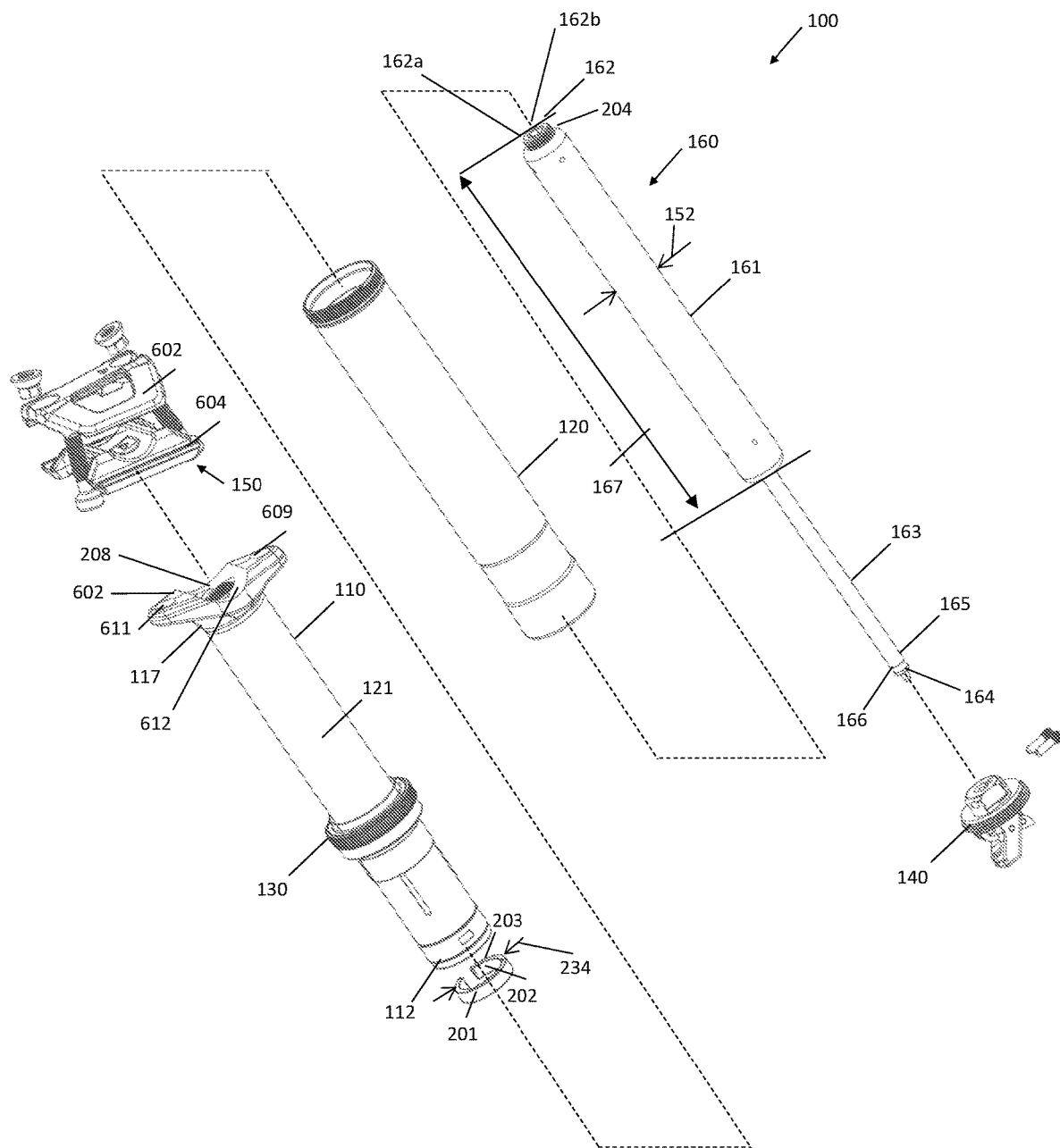
FIG. 6 is a partially exploded view of the dropper post of FIG. 4.

The cartridge outer tube 161 is preferably connectable to the inner tube 110 in a manner that is sufficiently strong enough to carry the forces described herein, and that allows the inner tube 110 to move with the cartridge outer tube 161. In the illustrated example, an upper connection portion (such as upper connection portion 162) is configured to attach the cartridge 160 to an upper end of the post inner tube 110. In this example the inner post tube 110 includes one or more suitable tube engagement member that is configured to engage, and preferably removably or releasably engage with one or more complimentary second or cartridge-related engagement member. When the one or more tube engagement member and second engagement member are engaged with each other, then the cartridge outer tube 161 is fixed relative to, and movable axially along with, the inner post tube 110, and when the tube engagement member and second engagement member are disengaged from each other, then the cartridge outer tube 161 is movable relative to, and preferably axially removable from, the inner post tube 110 (FIG. 6).

The upper tube engagement member can be any suitable structure and optionally be integrally formed with the post inner tube 110 or may be provided as a separate member than can be connected to the post inner tube 110. In this example, referring to FIGS. 6, 4*a* to 4*c*, and 8*c*, the one such upper tube engagement member includes threads 208 that are formed in the inner surface of the post inner tube 110, at its upper end 117. One other such tube engagement members can include threads at a lower end 112 of the inner tube 110 (such as shown in other embodiments herein). Other structures that can be used to limit axial movement of the cartridge tube relative to the inner tube 110 can be used in other embodiments.

The second or cartridge-related engagement member that is used for axially securing the cartridge assembly can be any structure that is compatible with the one or more corresponding tube engagement member, such as threads that can engage the tube threads 208, so that axial movement of the cartridge assembly relative to the inner tube 110 is inhibited. Optionally, as shown in this example, the dropper post assembly 100 can include a fastening member that is configured to include an appropriate second or cartridge-related engagement member and that can be fastened and unfastened to secure or release the spring cartridge 160 relative to the post inner tube 110. Providing the second or cartridge-related engagement member on a separate fastening member, instead of having it integrally formed on the cartridge outer tube 161 for example, may help simplify the construction of the cartridge 160 and may allow the walls of the cartridge outer tube 161 to be relatively thinner or smooth as compared to what would be required if a fastening element was integrated into the sidewall.

For example, referring to FIGS. 6, 7*a* to 7*c*, and 8*a* to 8*c*, in the present example the dropper post assembly 100 has a fastening member in the form of a cartridge upper seal head 192 that includes one example of a suitable second engagement member in the form of outer threads 162*a* that are sized and configured to mesh with the inward facing threads 208 at the upper end 117 of the post inner tube 110. The threads 162*a* of the cartridge 160 are an axial engagement member that allows for the cartridge 160 to be removably connected to the upper tube engagement member to axially secure the cartridge 160 to the inner tube 110. The upper tube engagement member and the cartridge-related engagement member, the tube treads 208 and the threads 162*a* on the cartridge 160, when threadingly engaged, prevent lateral or radial movement between the upper end of the cartridge tube and the upper end of the inner tube.

Optionally, regardless of whether the axial securing mechanism is at the upper end 114 or lower end 112 of the inner tube 110, it can be desirable in some embodiments of the assemblies described herein for a lower engagement member to provide at least some degree of lateral alignment and/or restraint for the cartridge outer tube 161 when the cartridge-related engagement member is installed. This may help align the cartridge outer tube 161 relative to the post inner tube 110 and/or may help keep a lower end of the cartridge outer tube 161 laterally centred (or otherwise positioned) relative to the lower end 112 of the post inner tube 110 when the cartridge-related engagement member is installed and the dropper post assembly 100 is in use. This may help prevent misalignment, buckling and/or rattling of the cartridge 160 relative to the inner tube 110. In some examples (such as shown in FIGS. 7a-7c), a lower engagement member may be configured to provide generally only lateral support (i.e., without a positive fastening mechanism or structure that is intended to strongly resist axial movement). In other examples (such as shown in FIGS. 16 and 17), the lower engagement member may be configured to both axially and laterally constrain the movement of the cartridge tube relative to the inner tube 110.

In the illustrated example, one version of a lower engagement member that can provide lateral constraint includes a ring 201, with laterally inward facing inward facing surface 202 that is disposed radially inward from the inner surface 111 of the clearance portion 121 of the inner tube 110, that can be provided within the interior of the inner tube 110, toward its lower end 112. Optionally, as shown in this example the ring 201 can be configured to be at least partially nested within a groove 116 that is formed in the inner surface of the post inner tube 110, at its lower end 112, so that the ring 201 is held in its desired axial location relative to the inner tube 110. Alternatively, the ring 201 could be secured using other techniques, such as glue, crimping, etc. to help keep the ring 201 in its desired axial position within the lower end of the inner tube.

While the ring 201 and inner tube 110 are shown as separate structures in this example other structures are possible. For example, the lower engagement member could be formed from material that is integrally formed with the inner tube 110, which could eliminate the need for a separate piece to be added/assembled. In such arrangements, the surface 202 could be provided on an inwardly projecting portion of the sidewall of the inner tube 110 that is configured to extend laterally inwardly from the inner surface 111 of the clearance portion 121 of the inner tube sidewall. This structure could be formed using any suitable technique, including forming the inner tube so that it initially has the relatively smaller interior area/diameter of surface 202 and then removing additional material from the inner tube sidewall (such as by machining, etc.) to expand the cross-sectional area of the clearance portion 121 of the sidewall that is axially above/inboard from the tube engagement member and surface 202. In such examples, the lower engagement member may be provided as a rib or boss projecting inwardly from the tube sidewall.

In this example, the clip/ring 201 that is configured to help laterally constrain the movement of at least the lower end 112 of the cartridge outer tube 161 relative to the post inner tube 110. The ring 201 is, in this example, laterally disposed between, and contacting at least one of the lower end of the cartridge tube 160 and the lower end 112 of the inner tube 110 sidewall surface 111. The ring 201 engages the groove 116 and is disposed entirely within the interior of the inner tube 110. While the ring 201 is installed and engaged with the groove 116, the cartridge 160 is axially translatable relative to the ring 201, and the cartridge 160 is axially insertable from the inner tube 110 without requiring removal of the ring 201.

Figure 9:
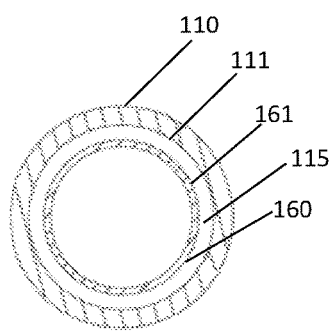
FIG. 9 is a cross-section view, taken laterally, of a dropper post.

In the illustrated example, the cartridge outer tube 161 generally fits snugly within the inner tube 110. The cartridge outer tube 161 may be smaller. The inner tube 110 has a cross-sectional that may be taken at a location between the upper end 117 and the lower end 112, in an axial direction that is perpendicular to the seat post 100. The cartridge 160 may have a cross-sectional area taken in the lateral direction that is less than 90% of the inner tube 110 cross-sectional area. Optionally, in some examples the cartridge 160 cross-sectional area taken in the lateral direction can be less than 89%, 88%, 87%, 86%, 85%, 84%, 83%, 83%, 81%, 80%, 79%, 78% or less than the inner tube 110 cross-sectional area. FIG. 9 shows the cartridge 160 disposed within the inner tube 110 at a cross-section taken laterally. In this example the cartridge 160 and the inner tube 110 are shown to be generally concentric. The cross-sectional area of cartridge 160 is measured with respect to the outer surface of the outer cartridge tube 161. The cross-sectional area of the inner tube 110 is measured with respect to the inner surface 111 of the inner tube 110. As the cartridge 160 has a cross-sectional area that is less than 85% of the inner tube 110 cross-sectional area, a gap 115 is defined between the outer surface of the cartridge outer tube 161 and the inner surface 111 of the inner tube 110. The clearance portion 115 is offset laterally inward from the inner surface 111 of the inner tube 110. By using a cartridge 160 with a smaller cross-sectional area, the weight of the dropper post 100 may be reduced.

As the cartridge 160 is aligned in the inner tube 110 to be generally concentric, and as both are generally circular in cross-section, the gap 115 that is defined between the outer surface of the cartridge outer tube 161 and the inner surface 111 of the inner tube 110 in this example is an annular gap.

To help constrain radial movement of a locking spring cartridge 160 with a reduced size resulting in an annular gap between the inner wall surface 111 of the post inner tube and the cartridge outer tube 161, the ring 201 may be thicker in the radial distance to abut the inner wall surface 111 to provide stability and prevent movement and/or rattling.

Figure 8A:
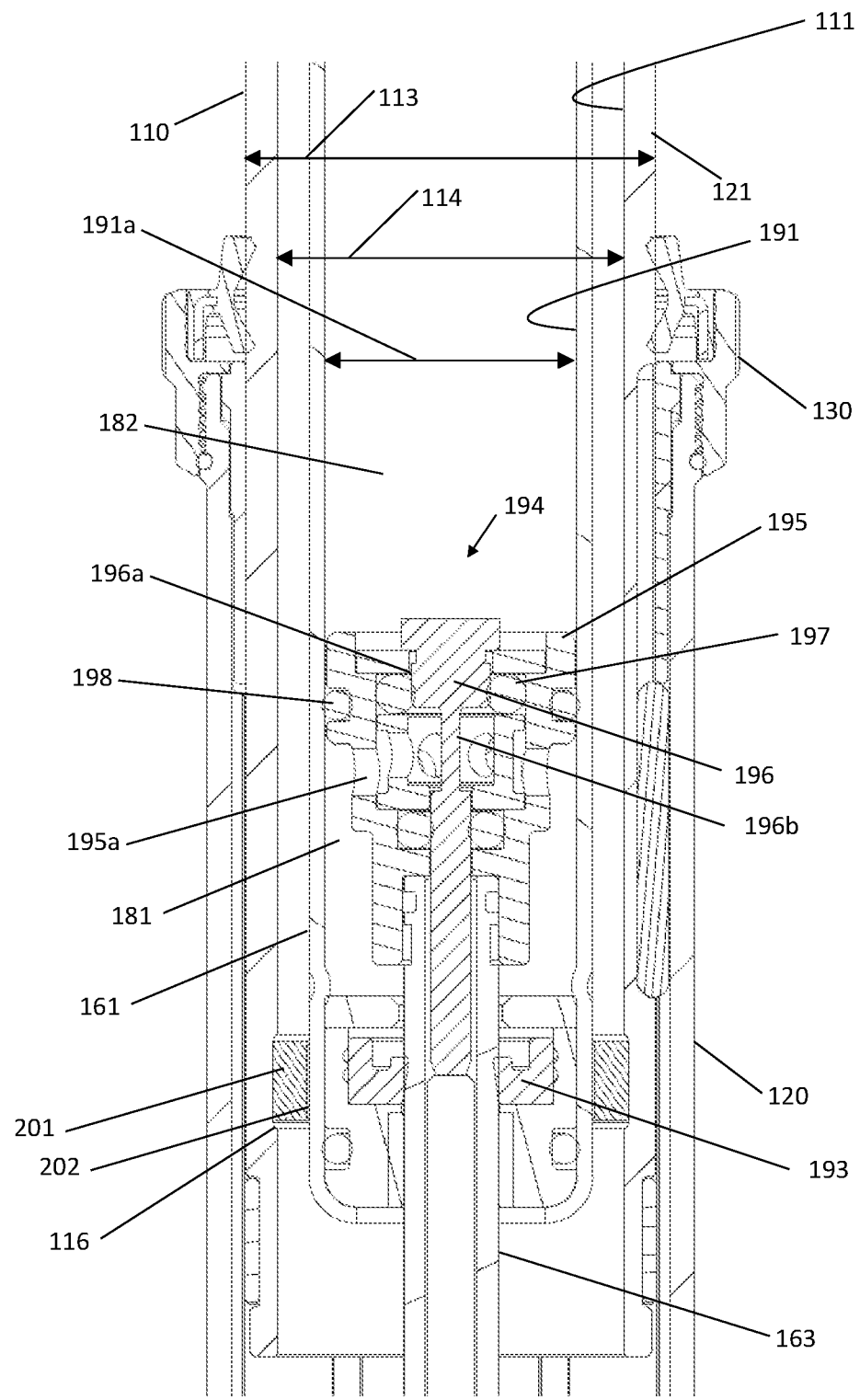
FIGS. 8a to 8c are enlarged views of a portion of the cross-sectional view of FIGS. 4a to 4c.
Figure 8B:
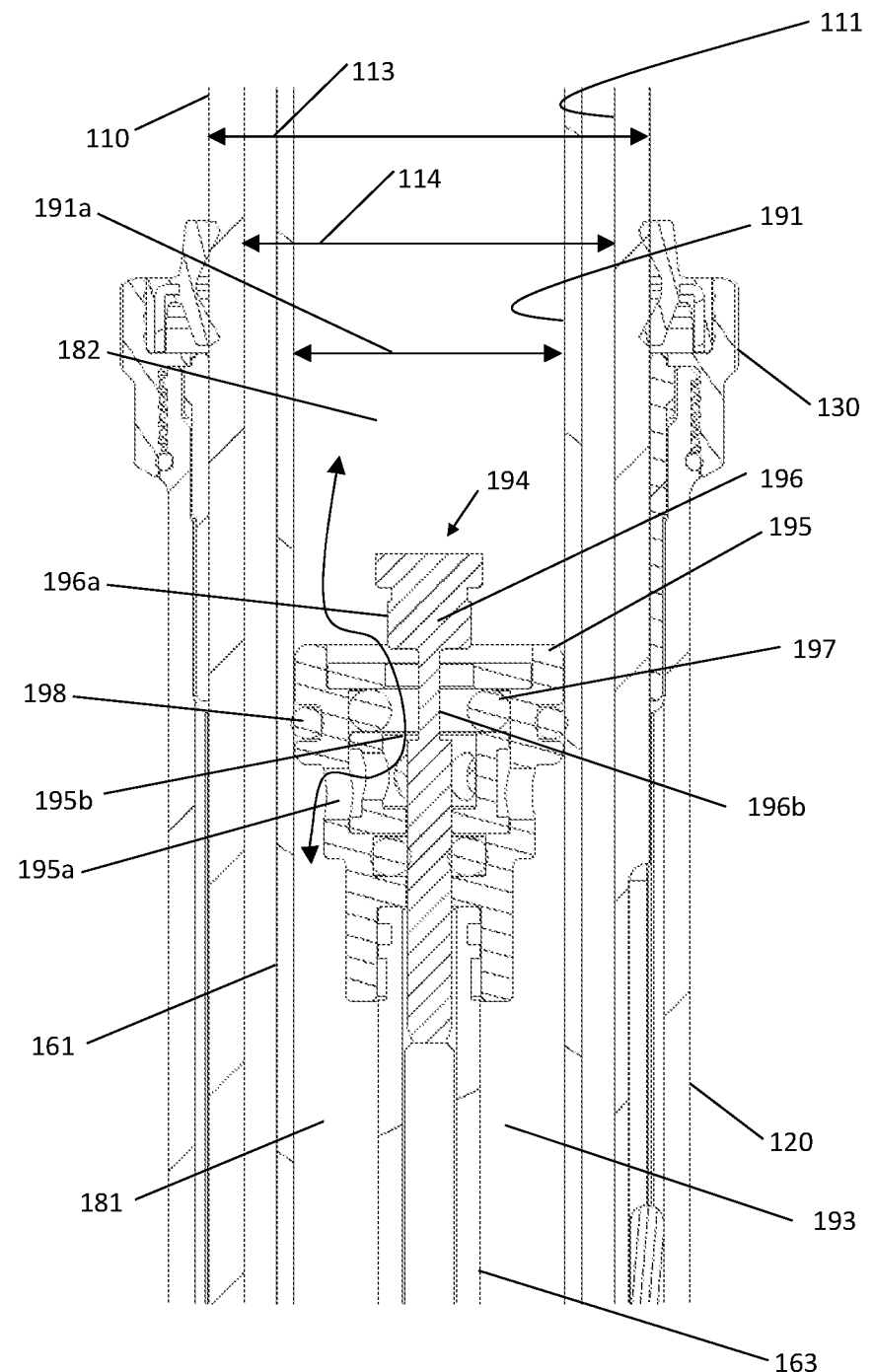
Figure 8C:
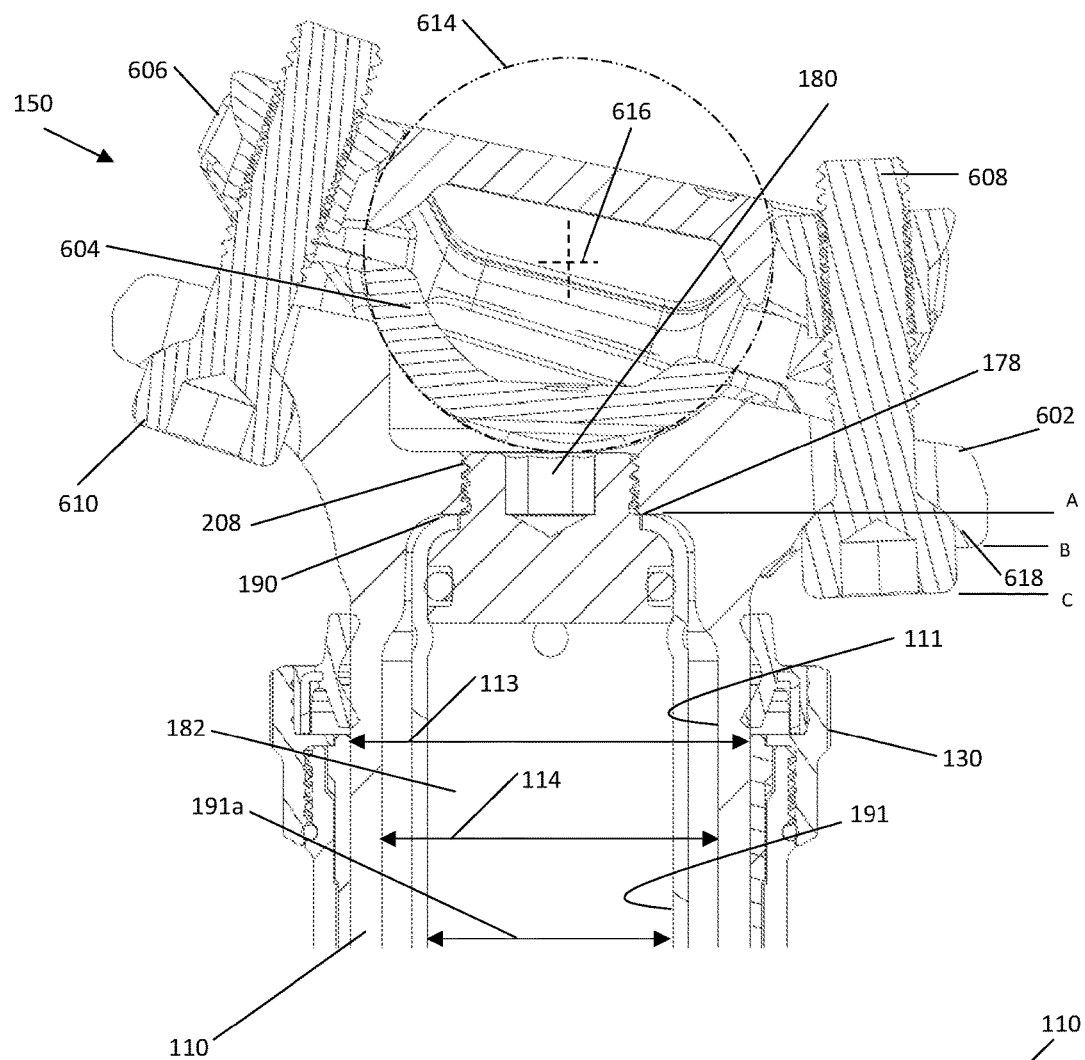

Referring to FIG. 8c, in this example the upper portion of the cartridge 160 includes the engagement member with the treads 208 and the tool interface 180 that secures the cartridge 160 to the post inner tube 110. The upper portion of the cartridge 160 has shoulders 190 that narrow towards the engagement member, with an abutment surface disposed laterally between the shoulders 190 and the engagement member. The abutment surface engages a complementary abutment surface within the upper end 117 of the seat post 100. The threads 208 of the engagement member secure the cartridge 160 laterally, and the abutment surface and the threads 208 secure the cartridge 160 axially. The lowermost portion of the cartridge 160 abutment surface lies in a laterally extending abutment plane A.

The seat attachment assembly 150 comprises a post head member 602, a lower seat clamp 604, a complementary upper seat clamp 606, and two fasteners 608/610, such as bolts. The post head member 602 comprises front and rear fastener apertures 609 and 611 on opposite sides of a central cradle portion 612 forming at least part of its upper surface (i.e., a surface that is generally upwardly facing when the bicycle is in use) that is configured to engage with a complimentary bearing surface on the lower seat clamp 604. The cradle portion 612 can be any shape that allows for a given embodiment of the lower seat clamp 604 to engage with and rest on the cradle portion 612. The cradle portion 612 can be configured to help facilitate relative pivoting/rotation of other portions of the seat attachment assembly 150, such as the lower seat clamp 604 and upper seat clamp 606, to help accommodate a generally forward/rearward tilting of the bicycle seat relative to the inner tube 110 to suit a rider/user's preferences. In the illustrated embodiment, the cradle portion 612 forms part of a rotation perimeter 614, that is centered around the rotation axis 616. The radius of curvature of the rotation perimeter 614 is defined by the radius of curvature of the cradle portion 612.

In the illustrated example, the post head member 602 has a front mounting portion 618 that includes the front fastener aperture 609 and projects forwardly beyond a perimeter of the inner tube 110 side wall. The front fastener aperture 609 is understood to be a feature on the post head member 602 that engages or at least partially receives a portion of the fastening members that are used to secure the seat clamps 604 and 606 in their desired position relative to the inner tube 110. This can include a through-hole or other type of opening that extends through the post head member 602 as illustrated in this example, but may also include open-sided slots, notches or other features that are not complete through holes. It is also possible that the fastener aperture 609 may be configured to capture or retain a part of the fastening mechanism, rather than to removable accommodate the bolt or screw as shown. For example, a region of the post head member 602 could include a recess to receive a nut or other threaded receiving portion that could interact with a bolt (such as if the bolt is inserted from above, rather than from below as illustrated in this example). It is also possible that the front fastener aperture could be an opening or region within the post head member 602 that includes integrally formed threads or other features that could engage with a removable or loosenable portion of a fastener.

Being able to position the upper end of the cartridge tube relatively high up within the inner tube, and preferably in a region that extends within the post head member 602 (but preferably does not interfere with the operation of the seat clamps 604 and 606) can help reduce the overall length of the spring cartridge assembly and help provide a relatively shorter overall post assembly length when the inner post is retracted. To help achieve this arrangement, the upper end of the cartridge tube is preferably nested high up with in the post head member, and the axial stop surface is positioned, so that the upper portion of the cartridge tube can extend axially beyond some features of the post head member 602, such as extending above the axial location of the front fastener aperture 609, and optionally extending close to or beyond the cradle surface and associated rotation perimeter, as described herein.

For example, in the illustrated embodiment, the lowermost part of the front mounting aperture 609 lies in and defines the axial location of a laterally extending post head plane that is perpendicular to the post axis and is illustrated as plane B in this example. In the illustrated example, the post head plane B is disposed at a location that is axially below the abutment plane A. This arrangement can help allow an upper end of the cartridge tube to extend relatively higher within the interior of the inner tube 110 (as compared to the prior art) and for at least some portions of the upper end of the cartridge tube to extend axially beyond the post head plane B. This can help provide a desired position/ nesting for the cartridge within the inner tube 110.

In some examples, such as in the embodiment shown in FIG. 16, the upper post portion of the cartridge assembly can be positioned at, or below, the abutment plane A. Alternatively, as shown in the present example, an uppermost portion of the cartridge assembly (e.g., the threads 208 of the upper engagement member) can extend axially beyond the axial stop surface. Optionally, in such embodiments, the post head member 602 can be configured so that the upper most portion of the cartridge assembly (i.e. the axially upper most feature that is also removable with the cartridge assembly from the interior of the inner tube) is disposed at a location that is above the cartridge abutment plane A and the post head plane B and optionally can be located so that it extends close to, but remains axially inboard of the rotation axis 616. Optionally, the uppermost portion of the cartridge assembly may be located axially between the rotation axis 616 and the rotation perimeter 614 (and the curved cradle surface), and optionally may be located axially in board from the rotation perimeter 614 such that no portion of the cartridge assembly is located within the rotation perimeter 614.

Also, in this example, the position of the abutment plane A is such that the threads 208 of the engagement member that are a part of the cartridge 160 extend upwardly but remain below the rotational perimeter 614 of the seat clamp assembly 150.

The fasteners 608/610 are used secure the seat clamp 150 assembly to the post head member 602. When the clamp assembly is in use, the lowermost part of the front fastener 608 lies in and defines a laterally extending fastener plane C, that is intended to represent a lowermost position where a front fastener is located while the post assembly is in use. To help provide the desired arrangement of the cartridge in some examples, the assembly 100 is configured so that the fastener plane C is generally parallel to and disposed axially below the post head plane B. By configuring the seat post 100 to receive the cartridge 160 in such a manner, i.e., with the cartridge 160 being disposed further axially upward within the inner tube 110, the overall weight and/or size of the seat post 100 may be reduced.

Within the interior of the cartridge outer tube 161 a piston assembly is provided to separate the interior of the cartridge outer tube 161 into two different chambers, and to help facilitate the translation of the cartridge outer tube 161 as described. The piston assembly can be of any suitable configuration that can operate as described herein. A valve mechanism is also preferably provided that can selectably allow fluid communication between the chambers on opposite sides of the piston assembly, as this can be used to lock and unlock the locking spring cartridge 160. The valve, and related fluid flow path regions, can be of any suitable configuration. To help reduce the overall size of the locking spring cartridge 160, it may be preferable to integrate a suitable valve mechanism within the piston assembly, as is shown in the present example that includes a piston valve 194 attached to the upper end 163a of a cartridge rod 163 that can extend from the piston valve 194 to the actuator assembly 140. The piston valve 194 is sized to generally fill the cartridge outer tube 161, is positioned axially between the upper and lower cartridge seal heads 192 and 193 and has a sealing portion that is positioned opposite and configured to seal against the sliding surface 191 and includes a body-sliding-surface o-ring 198 (or other suitable translatable sealing member). The piston valve 194, in this example, also includes a valve body 195, a plunger 196 that can move relative to the valve body 195, a body-piston o-ring 197. In this embodiment valve body 195 defines a valve body channel 195a and, when the valve is in the unlocked position as described herein, a valve inner pathway 195b (FIG. 8b). The plunger 196 includes a seal surface 196a, that can seal against the valve body 195 (e.g., against o-ring 197 in this example) to inhibit fluid flow through the piston valve, and neck portion 196b.

In this arrangement, the piston 194 divides the interior of the cartridge outer tube 161 into two operating chambers that can be fluidly isolated from each other while the locking spring cartridge 160 is in use to selectably lock and unlock the locking spring cartridge 160. For example, when the operating chambers are fluidly isolated from each other the locking spring cartridge 160 can be considered to be in a locked configuration and will resist movement of the cartridge outer tube 161 and seat post inner tube 110. In contrast, when the operating chambers are fluidly connected, such as by activating the piston valve 194 and allowing fluid (liquid and gas) to pass through the piston 194 and flow between the operating chambers, the locking spring cartridge 160 can be considered to be in an unlocked configuration and will facilitate the relative movement of the cartridge outer tube 161 and seat post inner tube 110 relative to the outer tube 120. As described herein, when the locking spring cartridge 160 is in use, and the piston valve 194 is opened/unlocked, the cartridge outer tube 161 can translate relative to the piston 194 to allow the seat post inner tube 110 to translate relative to the outer tube 120.

Referring to FIGS. 7a to 7c and 8a to 8c, in this example one, or a first, of the operating chambers is chamber 181, which is located axially between the piston valve 194 and the lower seal head 193 and is laterally bounded by the sliding surface 191. Preferably, the lower chamber 181 is configured to contain a mixture of liquid and gas or other material and can also be referred to as a liquid chamber. When the locking spring cartridge 160 is in use within the seat post 100 in the orientation illustrated in these Figures (which is also the orientation of the locking spring cartridge 160 when it is in use on a bicycle) the chamber 181 can be referred to as a lower chamber 181, but it is understood that the term lower is used for convenience and is not intended to limit the orientation of the locking spring cartridge 160 when in use.

In the present example, the other, or second, operating chamber is chamber 182 which is located axially between the piston valve 194 and the upper seal head 192 and is also laterally bounded by the sliding surface 191. Because of its relative location within the locking spring cartridge 160 as illustrated, the second chamber 182 can be referred to as an upper chamber 182, but it is understood that the term lower is used for convenience and is not intended to limit the orientation of the locking spring cartridge 160 when in use. Similar to lower chamber 181, the upper chamber 182 is preferably configured to contain a mixture of oil (or other suitable liquid) and pressurized air (or other suitable gas).

Under the intended operating conditions of the locking spring cartridge 160 the oil and air (or other liquid and gas) tend to separate from each other due to the differences in their densities and mechanical properties, such that an air/oil interface or boundary 183 is defined. In this arrangement, depending on the position of the piston valve 194, and therefore the extension or retraction of the inner tube 110 of the dropper seat post 100, the air/oil interface or boundary 183 may be within the lower chamber 181, or the upper chamber 182. When the inner tube 110 is fully retracted (FIG. 7c), the piston valve 194 is positioned such that the volume of the lower chamber 181 may be greater than the volume of the upper chamber 182. In this configuration, the upper chamber 182 contains only gas while the lower chamber 181 contains both oil and gas such that the air/oil interface or boundary 183 is in the lower chamber 181. In contrast, when the inner tube 110 is fully extended (FIG. 7a), the piston valve 194 is positioned such that the volume of the lower chamber 181 is less than the volume of the upper chamber 182. In this configuration, lower chamber 181 contains only oil/liquid and the upper chamber contains both oil and gas such that the air/oil interface or boundary 183 is in the upper chamber 182. In this arrangement, when moving the inner tube 110 from a fully retracted to a full extended position the piston valve 194 moves through the air/oil interface or boundary 183. When the piston valve 194 is actuated and its valve is open (FIGS. 7b and 8b), fluid communication between the upper chamber 182 and the lower chamber 181 is established. The lower seal head 193 is preferably always positioned next to oil to help provide the desired sealing performance.

As shown in FIGS. 7a to 7c, when the inner tube 110 is fully retracted (FIG. 7c), the piston valve 194 is positioned such that the volume of the lower chamber 181 is greater, and in this example more than double the volume of the upper chamber 182. As described herein, the volume of the lower chamber 181 when the dropper post is fully retracted is understood to define a retracted chamber volume. The retracted chamber volume is less than the total volume of the locking spring cartridge 160. To help provide the desired configuration of oil and gas mixtures within the chambers 181 and 182, and to help provide the liquid/gas boundary 183 in the desired locations described herein the cartridge 160 is configured so that the total volume of liquid (e.g., oil) that is contained within the locking spring cartridge 160 is less than the retracted chamber volume of the lower chamber 181. Preferably, the total volume of liquid contained within the locking spring cartridge 160 is less than the retracted chamber volume of lower chamber 181, and can be between 5% and 95%, and more preferably may be between about 10% and about 50%, of the retracted chamber volume, but may be less than 5% or more than 95% in some configurations, such that the gas/liquid boundary 183 may be at, or in contact with, the lower side of the piston valve 194 when the dropper post is fully retracted.

When the inner tube 110 of the dropper seat post 100 in this embodiment begins to retract, the piston valve 194 is initially submerged in the liquid and moves through the liquid for a first portion of its travel. The piston valve 194 then reaches and moves through the air/oil interface or boundary 183, after which the piston valve 194 then moves through air/gas for a second portion of its travel. Once the inner tube 110 is fully retracted, the piston valve 194 is surrounded by the gas. Because of the decreased friction/resistance the piston valve 194 may be able to move at relatively a faster speed when moving through the gas as compared to when it is travelling through the liquid. This can be characterised as the total travel/drop of the inner tube 110 being divided into at least two different drop segments. In the first drop segment the piston valve 194 moves at a slower speed when moving through the liquid. In the second drop segment the piston valve 194 moves at a relatively faster speed when moving through the gas. Due to the properties of the liquid and the gas the piston valve 194 experiences a greater resistance to movement when moving through the liquid than when moving through the gas. This results in the different speeds in the first and second drop segments. Once fully retracted, the piston valve 194 is beyond the air/oil interface or boundary 183, and preferably is spaced below the boundary 183 by at least 5% of the length of the lower chamber 181 (when in the retracted position).

When the inner tube 110 is fully extended, opening the piston valve 194 provides fluid communication between oil on both sides of the piston. When the inner tube is fully retracted, opening the piston valve 194 provides fluid communication between gas on both sides of the piston (e.g., gas within the first chamber 181 is in communication with gas within the second chamber 182). The gas is at a suitable operating pressure, which preferably can be above about 200 psi.

When the inner tube 110 is fully extended the total gas volume above the oil gas boundary is larger than when the inner tube 110 is fully retracted. The ratio of the fully extended gas volume to fully retracted gas volume is less than 1.4:1 and preferably less than 1.2:1. When fully extended the gas operating pressure is above 200 psi and preferably between 500-1000 psi. When retracted that decrease in the relative gas volume between the extended and retracted positions increases the operating pressure by less than 140% and preferably by less than 120%

That is, when the inner tube 110 is in the extended position, the locking spring cartridge 160 has a first internal gas pressure. The first internal gas pressure is preferably between 500 and 1000 psi. When the inner tube 110 is in the extended position, the locking spring cartridge 160 has a total extended volume which is the sum of the volume of the available fluid volume in the first and second chambers in the cartridge 160. Then the inner tube 110 is in the retracted position the locking spring cartridge 160 has a second internal gas pressure. The second internal gas pressure is preferably between 650 and 1300 psi. When the inner tube 110 is in the retracted position, the locking spring cartridge 160 has a total retracted volume which is the sum of the available fluid volume in the first and second chambers when the inner tube is in its retracted position. That is, by varying the amount of liquid that is contained within the cylinder and the available gas volume, the assemblies described herein can be configured so that the second internal gas pressure is optionally less than 200%, 190%, 180%, 170%, 160%, 150%, 140%, 130% and 120% or less of the first internal gas pressure, and in some embodiments the second internal gas pressure may be between about 140% and 120% of the first internal gas pressure, and in some embodiments may be approximately 130% of the first internal gas pressure.

The second internal gas pressure in this example is lower than the gas pressure in the prior art cartridges when in their retracted position. In the prior art there is a greater volume of oil in the cartridge and a relatively lower volume of gas, and the piston travels the axial length of the cartridge 960 to compress the gas. In this example there is a lower volume of oil in the cartridge and a higher volume gas, however the piston travels the same distance (the axial length of the cartridge 160) to compress the gas. The greater volume of gas results in the piston achieving a lower pressure, for a given piston travel distance, when the cartridge 360 is in the retracted position and the gas is compressed.

While illustrated as separate members in this example of dropper seat post 100, the cartridge outer tube 161 and upper tube 110 may alternatively be integrally formed with each other as is shown in another example of a dropper seat post 200. The seat post 200 is analogous to seat post 100 and like features are illustrated using like reference characters Cindexed by 100. As described further herein, seat post 200 can operate in substantially the same manner as seat post 100 but may have some slightly different components and configurations as a result of the integral formation of the cartridge outer tube 161 and upper tube 110 that do not materially alter how the posts 100 and 200 operate. For example, if the cartridge outer tube 161 and upper tube 110 are of integral, one-piece construction as shown in this second example then features such as the upper connection portion 162, that is used to connect the separate cartridge outer tube 161 to the upper tube 110 in the previous example, is not needed. Similar functioning components on dropper post 100 will now be described using characters indexed by 100 (i.e., 163 is now 263).

Figures 10, 11:
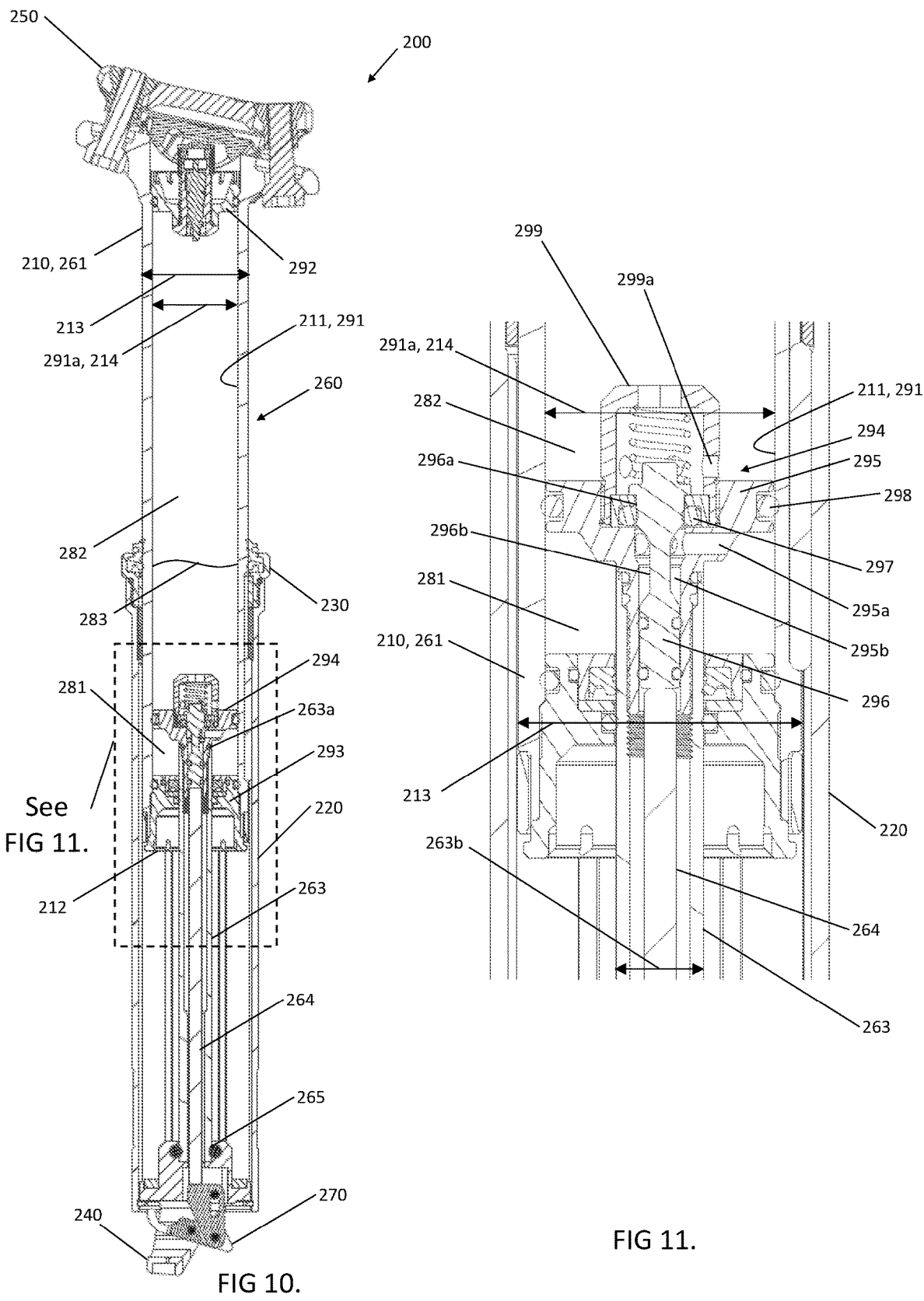
FIG. 10 is a cross-sectional view of another example of a dropper post.
FIG. 11 is an enlarged view of a portion of the cross-sectional view of FIG. 10.
Figures 18, 19:
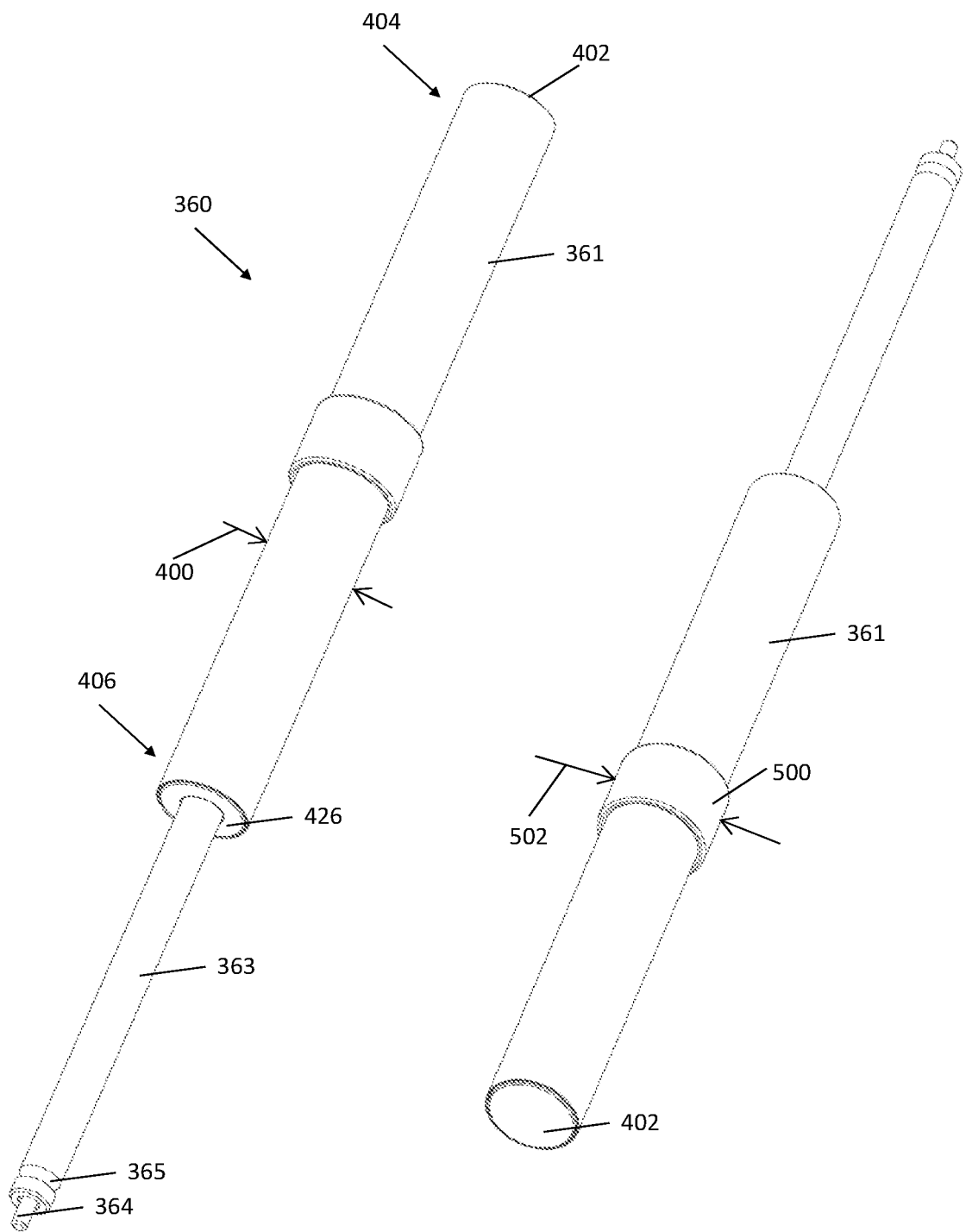
FIG. 18 is a perspective view of one example of a locking gas spring cartridge from below.
FIG. 19 is a perspective view of the locking gas spring cartridge of FIG. 18 from above.

FIGS. 10 and 11 illustrate an example of a dropper seat post 200 that embodies another preferred embodiment of the teachings described herein. In this example, the seat post 200 includes an inner tube 210, seat clamps 250, outer tube 220, seat collar 230, actuator assembly 240, including actuator mechanism 270. The inner tube 210 further includes lower end 212, inner wall surface 211, inner tube outer diameter 213 and inner tube inner diameter 214.

In contrast to the seat post 100, in this example the inner tube 210 and outer cartridge tube 261 are integrally formed together (i.e., are of integral, one-piece construction) so that the inner tube 210 forms a part of locking spring cartridge 260. This example of the locking spring cartridge 260 further includes an inner sliding surface 291 that defines a respective sliding surface diameter 291*a* (which is the same as tube inner diameter 214 in the case of dropper post 200), cartridge rod 263 defining a cartridge rod diameter 263*b*, locking groove 265 and actuation rod 264. Fixedly attached to sliding surface 291 are upper seal head 292 and lower seal head 293. While fixed during the operation of the locking spring cartridge 260 to help contain the liquid and gas within the cartridge tube 261, the upper and lower seal heads 292 and 293 (and analogous seals 192 and 193) can be removed for maintenance, assembly of the mechanism and for any other reason while the seat post 200 (or 100) is not in use.

In this example, the piston valve 294 is attached to the upper end 263*a* of cartridge rod 263 and is positioned so that it can seal against and slide relative to the sliding surface 291 and is located axially between the upper and lower cartridge seal heads 292 and 293. In this example, the sliding surface 291 is an inner surface of the inner tube 210.

Piston valve 294 further contains a valve body 295, a plunger 296, a body-piston o-ring 297, body-sliding-surface o-ring 298 (or other suitable sealing member) and valve cap 299. In this example, the valve (including the valve body 295, plunger 296 and related sealing members, etc.) are included as part of the piston that separates the chambers 281 and 282, which can help reduce the overall size of the dropper post 200. Alternatively, a different type of valve and liquid flow path may be provided that does not necessarily require the flow path to extend through the piston as illustrated.

Valve cap 299 defines a valve cap channel 299*a* and valve body 295 defines a valve body channel 295*a* and a valve inner pathway 295*b*. Plunger 296 further defines seal surface 296*a* and neck 296*b*. Lower chamber 281 located within sliding surface 291 and between piston valve 294 and lower seal head 293 contains a mixture of oil (or other suitable liquid) and pressurized air (or other suitable gas). Upper chamber 282 that is bounded by the sliding surface 291 and located axially between piston valve 294 and upper seal head 292 preferably contains a mixture of oil (or other suitable liquid) and pressurized air (or other suitable gas). When dropper post 200 is in a substantially upright position (as illustrated in FIGS. 6 and 7), the oil and air will tend to separate from each other. An air/oil boundary 283 is therefore defined.

In this arrangement, depending on the position of the piston valve 294, and therefore the extension or retraction of the inner tube 210 of the dropper seat post 200, the air/oil interface or boundary 283 may be within the lower chamber 281, or the upper chamber 282. When the inner tube 210 is fully retracted, the piston valve 294 is positioned such that the volume of the lower chamber 281 is greater than the volume of the upper chamber 282. In this configuration, the air/oil interface or boundary 283 is in the lower chamber 281. When the inner tube 210 is fully extended, the piston valve 294 is positioned such that the volume of the lower chamber 281 is less than the volume of the upper chamber 282. In this configuration, the air/oil interface or boundary 283 is in the upper chamber 282. When moving the inner tube 210 from a fully retracted to a full extended position the piston valve 294 moves through the air/oil interface or boundary 283.

When the inner tube 210 is fully retracted, the piston valve 294 is positioned such that the volume of the lower chamber 281 is greater, and in this example more than double the volume of the upper chamber 282. As described herein, the volume of the lower chamber 281 when the dropper post is fully retracted is understood to define a retracted chamber volume. The retracted chamber volume is less than the total volume of the locking spring cartridge 260. To help provide the desired configuration of oil and gas mixtures within the chambers 281 and 282, and to help provide the liquid/gas boundary 283 in the desired locations described herein the cartridge 260 is configured so that the total volume of liquid (e.g., oil) that is contained within the locking spring cartridge 260 is less than the retracted chamber volume of the lower chamber 281. Preferably, the total volume of liquid contained within the locking spring cartridge 260 is less than the retracted chamber volume of lower chamber 281, and can be between 5% and 95%, and more preferably may be between about 10% and about 50%, of the retracted chamber volume, but may be less than 5% or more than 95% in some configurations, such that the gas/liquid boundary 283 may be at, or in contact with, the lower side of the piston valve 194 when the dropper post is fully retracted.

When the inner tube 210 of the dropper seat post 200 begins to retract, the piston valve 294 is submerged in the liquid and moves through the liquid. The piston valve 294 then moves through the air/oil interface or boundary 283. The piston valve 294 then moves through gas. Once the inner tube 210 is fully retracted, the piston valve 294 is surrounded by the gas. The piston valve 294 moves at a faster speed when moving through the gas. This can be characterised as drop two different drop segments. In the first drop segment the piston valve 294 moves at a slower speed when moving through the liquid. In the second drop segment the piston valve 294 moves at a faster speed when moving through the gas. Due to the properties of the liquid and the gas the piston valve 294 experiences a greater resistance to movement when moving through the liquid than when moving through the gas. This results in the different speeds in the first and second drop segments. Once fully retracted, the piston valve 294 is beyond the air/oil interface or boundary 283 by at least 5% of the length of the lower chamber 181 (when in the retracted position).

When the inner tube 210 is fully extended, opening the piston valve 294 provides fluid communication between oil on both sides of the piston. When the inner tube is fully retracted, opening the piston valve 294 provides fluid communication between gas on both sides of the piston. The gas is at an operating pressure that is above about 200 psi.

Referring to FIGS. 12 to 27 another example of a dropper post assembly 300 for supporting a bicycle seat (not shown) is illustrated. Many aspects of the seat or dropper post assembly 300 are analogous to the dropper post assembly 100 and like features are illustrated using like reference characters indexed by 200. Notably, the design of the locking spring cartridge 360 differs somewhat from the design of the locking spring cartridge 160 and the manner that the locking spring cartridge 360 is connected to the rest of the assembly (notably the inner post tube 310) is different than in other embodiments described herein. Portions of the inner post tube 310 are accordingly different than portions of the inner post tube 110 with regards to how the cartridge 360 engages the inner post tube 310, but the inner post tube 310 can otherwise operate in a manner that is analogous to the inner post tube 110. However, the internal operation of the cartridge 360 can be analogous to the operation of cartridge 160 and is consistent with the descriptions herein. In addition to the differences in the attachment features of the cartridge 360, the dropper post assembly 300 can operate in substantially the same manner as seat post 100 but may have some slightly different components and configurations as a result of the design of cartridge 360 or other factors that do not materially alter how the posts 100 and 300 operate. Similar functioning components on dropper post assembly 300 will now be described using characters indexed by 200 (i.e., 110 is now 310).

In this example, the dropper seat post assembly 300 includes an inner tube 310, seat clamps 350 disposed at an upper end of the inner tube 310 for connecting to a bicycle seat (not shown), an outer tube 320, a seat collar 330, an actuator assembly 340, including actuator mechanism 370, and a locking spring cartridge 360.

Referring to FIGS. 14 to 19, in this example the locking spring cartridge 360 that is suitable for use with the dropper posts described herein includes a cartridge outer tube 361 that has a sidewall with an inner surface that can be engaged by portions of the cartridge and can form part of the boundary of internal cartridge chambers and/or may be part of the sealing structures. The locking spring cartridge 360 also includes a cartridge rod 363, locking groove 365 and compatible actuator rod 364

In this example, the inner surface of the cartridge outer tube 361 can be referred to as an inner sliding surface 391 that defines a sliding surface diameter 391a. The outer surface of the cartridge outer tube 361 defines a cartridge outer diameter 400, which in the illustrated example is substantially constant along the axial length of the cartridge outer tube 361 (but which could vary along its length in other examples).

The cartridge outer tube 361 also includes an upper end wall with an upper cap surface 402 that covers and optionally seals an upper end of the cartridge outer tube 361 and that does not need to include the upper connection portion (such as portion 162 described herein) because the connection between the outer cartridge tube 361 and the inner post tube 310 is different in this example. That is, the upper cap surface 402 can be any desired configuration, including a substantially flat, planar surface as illustrated in this example. The upper cap surface 402 could also have other configurations, including non-planar configurations, that are desirable to interface with a given inner post tube 310, but preferably the the upper end 404 of the outer cartridge tube 361 does not include a fastening mechanism for connecting the cartridge to the inner tube 310. Providing an upper end 404, including upper cap surface 402, that is substantially flat as illustrated may help reduce the overall axial length of the cartridge outer tube 361. In this example, the upper cap surface 402 forms the axially upper most or outer most portion of the cartridge outer tube 361 (and of the entire cartridge 360) and is configured such that is disposed within the interior of the inner post tube 310 and does not extend axially beyond the upper end of the inner post tube 310 and need not be accessible from the upper end of the inner post tube 310. This may help reduce the overall length of the cartridge 360 and may help simplify construction of the cartridge post tube 361 or inner post tube 310. In this arrangement, the entirety of the cartridge post tube 361, and of the locking spring cartridge 360 is located axially below and inboard the upper end 317, and the inward facing axial stop surface 319 of the upper end wall of the post inner tube 310. The upper end of the post inner tube 310 may optionally include a recess that connects to its interior or may be a solid upper wall that covers and seals the upper end 317 of the post inner tube 310.

The cartridge outer tube 361 is preferably connectable to the inner tube 310 in a manner that is sufficiently strong enough to carry the forces described herein, and that allows the inner tube 310 to move with the cartridge outer tube 361. In the illustrated example, instead of an upper connection portion (such as upper connection portion 162) that is configured to attach the cartridge 360 to an upper end of the post inner tube 310, the dropper post assembly 300 is configured such that the connection between the outer cartridge tube 361 and the inner post tube 310 is provided toward the lower end 406 of the outer cartridge tube 361 and toward the lower end of the inner post tube 310 as described herein. That is, in this example the inner post tube 310 includes a suitable tube engagement member that is configured to engage, and preferably removably or releasably engage with a complimentary second or cartridge-related engagement member. When the tube engagement member and second engagement member are engaged with each other, then the cartridge outer tube 361 is fixed relative to, and movable axially along with, the inner post tube 310, and when the tube engagement member and second engagement member are disengaged from each other, then the cartridge outer tube 361 is movable relative to, and preferably axially removable from, the inner post tube 310.

In this example, the upper tube engagement member includes the captive sidewall portion 382 of the inner tube 310. The captive sidewall portion 382 defines a captive cross-sectional area taken in the lateral direction that is smaller than the cross-sectional area taken at a central portion of the inner tube 310. In this arrangement, the cartridge 360 cross-sectional area is more than 85% of the captive cross-sectional area, and optionally may be more than 88%, 90%, 92%, 94%, 96% and 98% or more of the captive cross-sectional area. In some examples, the captive cross-sectional area may be substantially the same as the cross-sectional area of the cartridge tube cross-sectional area. The results in the cartridge 360 being closely received within the captive sidewall portion 382 and fitting more snugly than lower portions of the cartridge. Lateral movement of the upper end of the cartridge 360, relative to the upper end 317 of the inner tube 360, is therefore restrained. However, without a positive fastening mechanism, like the threads in other embodiments described herein, the upper end of the cartridge 360 may not be axially restrained by the captive sidewall portion 382.

The tube engagement member can be any suitable structure and optionally be integrally formed with the post inner tube 310 or may be provided as a separate member that can be connected to the post inner tube 310. In this example, referring to FIGS. 15 and 17, the tube engagement member includes threads 408 that are formed in the inner surface of the post inner tube 310, at its lower or inner end 312. Other structures are possible.

The second or cartridge related engagement member can be any structure that is compatible with the corresponding tube engagement member, such as threads that can engage the tube threads 408. Optionally, as shown in this example, the dropper post assembly 300 can include a separate fastening member that is configured to include an appropriate second or cartridge related engagement member and that can be fastened and unfastened to secure or release the spring cartridge 360 relative to the post inner tube 310. Providing the second engagement member on a separate fasting member, instead of having it integrally formed on the cartridge outer tube 361 for example, may help simply the construction of the cartridge 360 and may allow the walls of the cartridge outer tube 361 to be relatively thinner or smooth as compared to what would be required if a fastening element was integrated into the sidewall.

Figure 20:
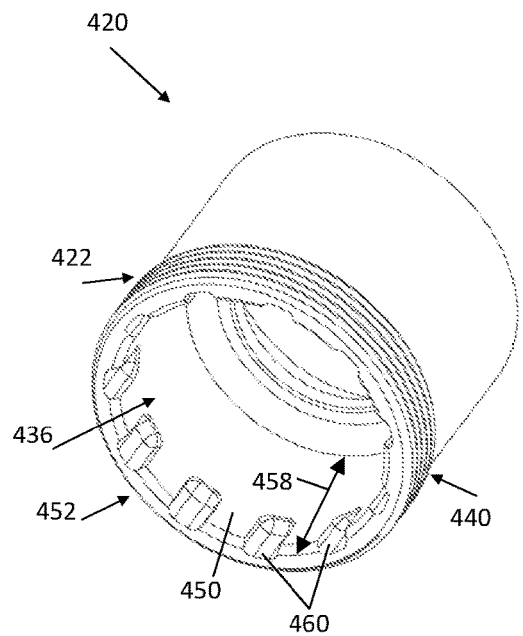
FIG. 20 is a perspective view of one example of a lockring from below.
Figure 21:
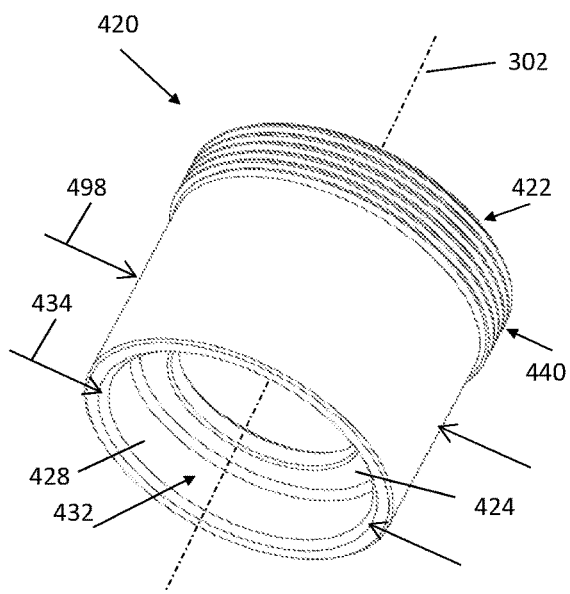
FIG. 21 is a perspective view of the lockring of FIG. 20 from above.
Figure 22:
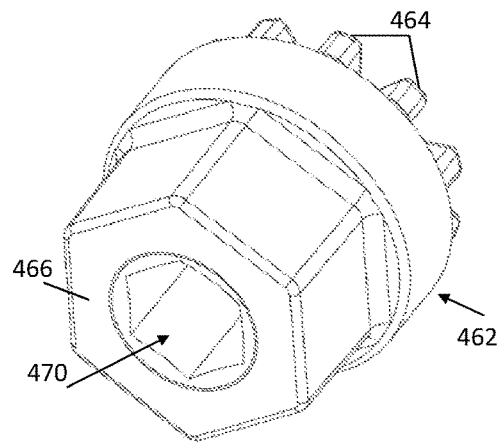
FIG. 22 is a perspective view of one example of a driving tool form one side.
Figure 23:
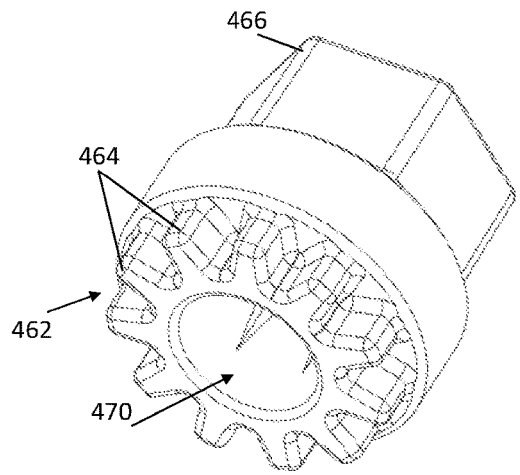
FIG. 23 is a perspective view of the driving tool of FIG. 22 from above.

For example, referring also to FIGS. 15, 20 and 21, in the present example the dropper post assembly 300 has a fastening member in the form of a cartridge lockring 420 that includes one example of a suitable second engagement member in the form of outer threads 422 that are sized and configured to mesh with the inward facing threads at the lower end 312 of the post inner tube 310.

In this example, the lockring 420 is configured to be removably insertable in the lower end 312 of the inner tube 310, by threading and unthreading the threads 422. In addition to the second engagement member, the lockring 420 also includes other suitable abutment and retaining features to interface with at least one of the cartridges outer tube 361 and post inner tube 310 and also to accommodate the extension of other cartridge features, such as the cartridge rod 363 when the lockring 420 is in place. In this example, the lockring 420 has an abutment surface 424 that is positioned to face and bear against an opposing lower surface on the cartridge outer tube 361 when the lockring 420 is installed. In this arrangement, when the fastening member, such as lockring 420, is inserted into the lower end 312 of the inner tube 310 the abutment surface 424 bears against lower surface 426 thereby urging the cartridge outer tube 361 axially upward. When the lockring 420 is tightened, the cartridge outer tube 361 is compressed axially between the abutment surface 424 and the axial stop surface 319 at the upper end 317 of the post inner tube 310. This arrangement can help inhibit, and preferably stop any relative axial movement between the cartridge outer tube 361 and the post inner tube 310 when the lockring 420 is installed.

Optionally, the fastening member, such as the lockring 420 or analogous member, may only be configured to engage the cartridge outer tube 361 in the axial direction. Alternatively, it may be preferable for the fastening member to also provide at least some degree of lateral alignment and/or restraint for the cartridge outer tube 361 when the fastening member is installed. This may help align the cartridge outer tube 361 relative to the post inner tube 310 and/or may help keep a lower end of the cartridge outer tube 361 laterally centred (or otherwise positioned) relative to the lower end 312 of the post inner tube 310 when the fastening member is installed and the dropper post assembly 300 is in use. The fastening member is disposed laterally between the lower end of the cartridge 360 and the inner tube 310 sidewall. This may help prevent misalignment, buckling and/or rattling of the cartridge 360 relative to the inner tube 310.

In the illustrated example, the lockring 420 is configured to also help laterally constrain the movement of at least the lower end 406 of the cartridge outer tube 361 relative to the post inner tube 310. In this example, the lockring 420 has a lateral alignment member in the form of a captive sidewall 428 that extends axially away from the abutment surface 424 by a captive wall height. Together, the abutment surface 424 and captive sidewall 428 cooperate to least partially define a tube recess 432 at the upper end of the lockring 420 that is sized and shaped to closely receive and to accommodate the lower end 406 of the cartridge outer tube 361. When the lockring 420 is installed, at least a portion of the captive sidewall 428 is located laterally (radially) between the cartridge outer tube 361 and the sidewall 310a of the post inner tube 310.

In this arrangement, the captive sidewall 428 laterally surrounds the tube recess 432 and defines a recess diameter 434. The recess diameter 434 can be any suitable diameter, and preferably is substantially the same as an outer diameter 400 of the cartridge outer tube 361. This can help provide a relatively snug fit between the cartridge outer tube 361 and the captive sidewall 428, and lockring 420, so that the lateral movement of the lower end 406 of the cartridge outer tube 361 relative to the lockring 420, and also between the lower end 406 of the cartridge outer tube 361 the lower end 312 of the post inner tube 310 is inhibited, and preferably eliminated.

To help install and remove the lockring 420 the post assembly can include a suitable driving tool that is compatible with the lockring 420. A convention screwdriver or the like may not be the most appropriate driving tool because the lower end 440 of the lockring 420 does not have solid surface. Instead, the lower end 440 includes the rod aperture 436. To help facilitate driving, in this example, an inner surface 450 of the lower end 440 of the lockring 420 includes a drive portion 452 that is configured to be engaged by a corresponding driving tool used to secure the lockring 420 within the post inner tube 310. This drive portion 452 extends around the perimeter of a lower recess 454 that has an inner diameter and an axial length 458. This lower recess 454 can accommodate other portions of the assembly and, for example, when the inner post tube 310 is in its retracted position at least a portion of the actuator 340 that is at the lower end of the post outer tube 320 can be received within the lower recess 454, such that the lockring 420 at least partially overlaps the actuator 340 when the inner post tube 310 is retracted (such as in a configuration that is the same as shown in FIG. 1). This may help provide a relatively longer drop length/travel distance for the inner post tube 310 as compared to an arrangement in which the lockring 420 does not axially overlap with the actuator 340.

To help ensure the lower recess remains relatively clear and unobstructed to provide the desired clearance for the cartridge rod 363 and nesting of other components (such as the actuator 340), the drive portion 452 in this example includes a plurality of axially extending grooves 460 spaced apart from each other around a perimeter lower recess 454. To engage the grooves 460 of the drive portion 452, a compatible driving tool, such as tool 462, can have a plurality of corresponding tool splines 464 designed to engage the grooves 460 and a mounting portion 466 that is configured to be engaged by a driver (not shown), such as a wrench, spanner wrench, fingers, pliers/grips/channel locks, a ratchet or the like. Like lockring 420, the drive tool 462 preferably includes an axial aperture 470 that extends through the body of the drive tool 462. The aperture 470 is sized to allow the cartridge rod 363 to pass through the drive tool 462 when it is engaged with the lockring 420. When the splines 464 are engaged with the grooves 460, the aperture 470 in the drive tool 462 is registered with the rod aperture 436 in the lockring 420 and the cartridge rod 363 can extend through both.

Referring again to FIGS. 12 to 15 in this arrangement, both the inner tube 310 and outer tube 320 are elongate, tubular members that extend along a post axis 302. In this example, the inner tube 310 is configured to slide telescopically within the outer tube 320 between a retracted position and an extended position (FIGS. 11 to 13, for example). The inner tube 310 includes a lower end 312 that is sized to fit within the outer tube 320 and that is intended to be retained within the outer tube 320 in both the retracted and extended configurations. The inner post tube 310 also has sidewall 310a with an inner wall surface 311 and defines an inner tube outer diameter 313 that is sized to fit within the post outer tube 320.

Configuring the assembly such that the fastener used to secure the cartridge outer tube 361 is located toward the lower end 312 of the post inner tube 310, rather than at its upper end 317, can help facilitate the use of different interior surface features on tube 310 than were shown on post inner tube 110. For example, in this embodiment, the inner wall surface 311 preferably includes at least two regions or portions that have different respective inner diameters (and therefore different wall thicknesses if a constant outer diameter 313 is used) and can engage, or not engage, with the cartridge 360 in different ways, and optionally can have different internal diameters and wall thicknesses.

For example, the post inner tube 310 in this example includes an upper captive portion 380 disposed toward its upper end 317 and the sidewall 310a of the inner post tube 310 has a captive sidewall portion 382 that has a first, captive inner diameter 314a and therefore defines a corresponding captive wall thickness 384 in the lateral direction, which in this example is a difference between the outer diameter 313 and the captive inner diameter 314a. The captive sidewall portion 382 has an axial length 480 and, together with the axial stop surface 319 of the upper end wall cooperates to define an upper cartridge pocket 482.

The captive inner diameter 314a is preferably sized so that is slightly larger than the outer diameter 400 of the cartridge outer tube 361, and preferably is substantially the same as the outer diameter 400. This can allow the upper end 404 of the cartridge outer tube 361 to be axially inserted into the upper cartridge pocket 482 and be generally snugly received by the captive sidewall portion 382. When the upper end 404 of the cartridge outer tube 361 is fully inserted in this manner, i.e. when the lockring 420 is tightened, the upper cap surface 402, or any intervening structure such as a washer, gasket or other member that is positioned next to the upper cap surface 402 can bear against the axial stop surface 319 to inhibit upward axial movement of the cartridge outer tube 361, and the captive sidewall portion 382 can engage the cartridge outer tube 361 to inhibit lateral movement of the upper end 404. With the cartridge outer tube 361 inserted in this manner and with the lockring 420 installed, both the upper end 404 and lower end 406 of the cartridge outer tube 361 are both axially and laterally constrained relative to the post inner tube 310. Because cartridge outer tube 361 is constrained by captive diameter 314a on the post inner tube 310 and by recess diameter 434, both of which are smaller than clearance diameter 314b, cartridge 360 is at less buckling risk when loaded than prior art dropper 960 configuration described herein.

The axial stop surface 319 and upper cap surface 402 are preferably complimentary to each other such that they can interface/abut in a desired manner, but they need not be in direct physical contact with each other in all embodiments of the teachings described herein. While both surfaces 319 and 402 are shown as flat planar surfaces in this example, other complimentary arrangements are possible. Optionally, a washer or other such member may be placed between axial stop surface 319 and upper cap surface 402. In such arrangements, the axial stop surface 319 can still be understood as inhibiting the upward axial movement of the cartridge 360 relative to the inner tube 310 even if the washer or other such component is located axially between the axial stop surface 319 and upper cap surface 402. Similarly, in other embodiments described herein washers, gaskets and/or other objects may be placed axially between an upper end of the cartridge tube and the upper end of the inner tube.

Instead of having a constant inner diameter and lateral cross-sectional area along its length, the post inner tube 310 may include an intermediate, clearance portion 321 that is located between the upper and lower ends of the inner tube and positioned so that it faces and is aligned with the central portion of the cartridge tube that has a different inner diameter 314b that is larger than the diameter 314a, and a correspondingly larger lateral cross-sectional area, that is larger than the outer diameter 400 of the cartridge outer tube 361. In this configuration, the wall thickness 492 of the clearance portion 321 is less than the thickness 384 of the captive portion, while the available internal cross-sectional area is greater in the clearance portion 321 than the cross-sectional area in the captive portion, which can reduce the amount of material used to create the post inner tube 310 and may reduce its weight. This arrangement also creates a generally annular gap 494 between the cartridge outer tube 361 and inner surface of clearance portion 321, that has a gap width 496.

Optionally, as shown in this embodiment, the clearance portion 321 can extend to the lower end 312 of the post inner tube 310 and in this example, the inner diameter 314b, and related lateral cross-sectional area is substantially the same as the outer diameter 498 of the lockring 420 to allow the lockring 420 to be inserted. In this arrangement, the captive diameter 314a, and lateral cross-sectional area at that location, can be the smallest internal diameter of the post inner tube 310, and the clearance diameter 314b is the largest internal diameter and is below the captive diameter 314a.

Figure 26:
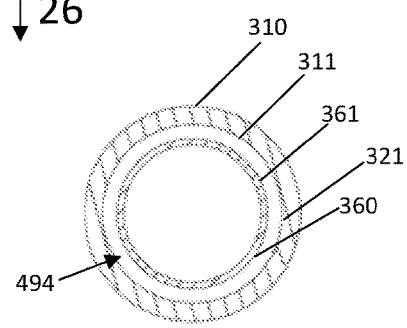
FIG. 26 is a cross-section view, taken laterally at line 26-26, of a dropper post.

Optionally, the upper end of the cartridge outer tube 361 may generally fit snugly within the captive sidewall portion 382 while, between its upper and lower ends 317 and 312, the clearance section 321 is sized to receive the cartridge tube 361 more loosely than the captive sidewall portion 382. In this example, the inner tube 310 has a cross-sectional area that may be taken through the clearance section 321 (e.g., at a location that is axially between the upper end 317 and the lower end 312), in a lateral direction that is perpendicular to the length/axis of the seat post 300. The cartridge 360 may have a cross-sectional area taken in the same lateral direction and at the same location that is less than 90% of the inner tube 310 cross-sectional area. Preferably, the cartridge 360 cross-sectional area taken in the lateral direction that is less than 89%, 88%, 87%, 86%, 85%, or 80% or less of the inner tube 310 cross-sectional area. For example, the cross-sectional area of the inner tube taken through the clearance section 321 may be between 336 mm² for relatively shorter travel posts and 376 mm² for relatively longer travel posts in some embodiments, and the cross-sectional area of the cartridge tube taken in the same location may be between 201 mm² and 314 mm² and preferably about 254 mm². For example, a cartridge tube with a cross-sectional area of about 254 mm² that is positioned FIG. 26 shows the cartridge 360 disposed within the inner tube 310 at a cross-section taken laterally. In this example the cartridge 360 and the inner tube 310 are shown to be generally concentric. The cross-sectional area of the cartridge 160 is measured with respect to the outer surface of the outer cartridge tube 361. The cross-sectional area of the inner tube 310 is measured with respect to the inner surface 311 of the inner tube 310. As the cartridge 360 has a cross-sectional area that is less than 90% and optionally less than 85% of the inner tube 310 cross-sectional area, lateral space/gap 494 is defined between the outer surface 361 of the cartridge outer tube and the inner surface 311 of the inner tube 310. In this arrangement, the outer surface 361 is offset laterally inward from the inner surface 311 of the inner tube 310. By using a cartridge 360 with a smaller cross-sectional area, the overall weight of the dropper post 300 may be reduced. In other examples, the inner surface of the inner tube need not be circular, and may be oval, polygonal or may have other shapes, but the non-circular shapes can still define a cross-sectional area (e.g., a non-circular area) that is consistent with the relationships and ratios described herein.

If the cartridge 360 is laterally aligned in the inner tube 310 to be generally concentric, as illustrated, and as both are generally circular in cross-section, the space that is defined between the outer surface 361 of the cartridge outer tube and the inner surface 311 of the inner tube 310 forms a substantially the annular gap 494 in this example, that laterally surrounds the cartridge tube. The clearance section 321 can have a length 131 (Figure in the axial direction, and preferably the inner tube 310 is configured so that the clearance section 321 forms at least 30%, 35%, 40%, 45%, 50%, 55%, 60%, 65% or more of the overall axial length 167 (FIG. 6) of the cartridge 360.

Optionally, the interior of the post inner tube 310 may be configured so that its internal diameter, and therefore its internal cross-sectional area, remains generally constant or widens toward its lower end 312, and it is generally free from undercuts or regions in which an inner diameter at a lower portion is smaller than an inner diameter of a relatively higher portion. Configuring the post inner tube 310 in this manner may help simplify manufacture of the post inner tube 312.

Optionally, to help fill a portion of the gap 494 a bumper 500 can be provided, having a bumper diameter 502 that fits between the cartridge outer tube 361 and clearance portion 490. The bumper 500 can help reduce rattling and/or lateral movement of a central portion of the cartridge outer tube 361 relative to the post inner tube 360, and may be formed from any suitable material, including materials like plastic, metal, rubber, foam, wood and the like that may also help damper vibrations and/or reduce noise. The bumper 500 may be formed from the same material or a different material than the cartridge outer tube 361 and may be either integrally formed with the cartridge outer tube 361 (if made of the same material) or may be a separate member that is connectable, and optionally removable from the cartridge outer tube 361. Different bumpers 500, with different diameters 502, could be used in combination with a common cartridge outer tube 361 to help facilitate the desired fit between the cartridge outer tube 361 and post inner tubes having different internal diameters and configurations.

The bumper 500 laterally encircles the cartridge outer tube 361 and the length of the bumper extends axially. The length of the bumper 500 is preferably less than the total length of the cartridge tube, and can be less than 50%, 40%, 30%, 20% 15% or less of the axial length of the cartridge outer tube 361. This may help provide some desired lateral restraint without requiring that the entire length of the gap 494 be filled, which may help reduce the overall weight of the assembly. The bumper 500 may be located within an axially middle portion of the outer cartridge tube 361 or optionally may be positioned at the axial midpoint of the outer cartridge tube 361, or at any point along the axial length of the outer cartridge tube 361 so as to restrict lateral movement and or rattling of the outer cartridge tube 361.

Figure 27:
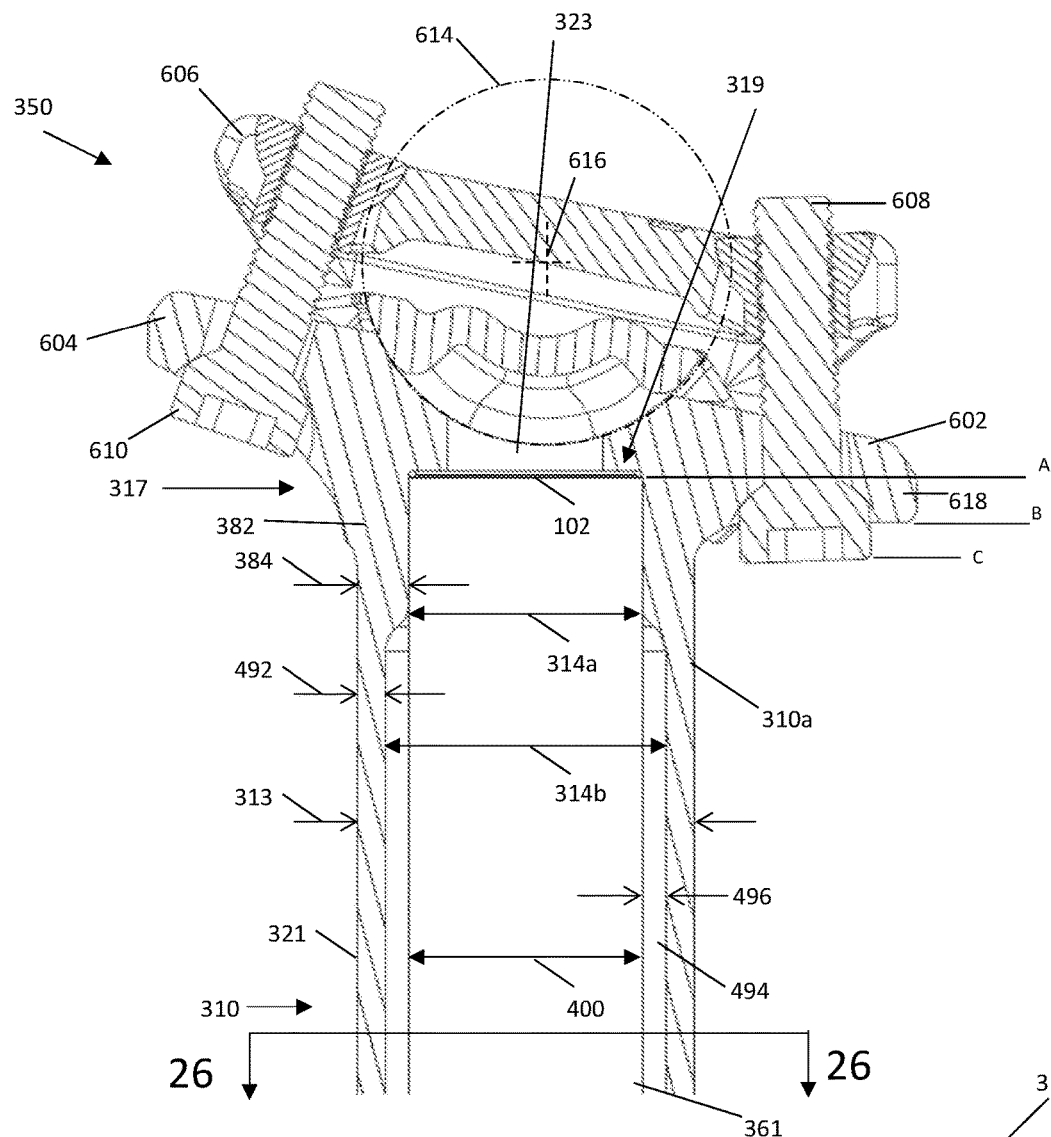
FIG. 27 is another enlarged view of a portion of FIG. 24.

Referring to FIG. 27, in this example the upper portion of the cartridge 360 is received within the captive sidewall portion 382 in the upper end 317 of the inner tube 310. The upper cap surface 402 of the cartridge 360 is generally planar and abuts against an abutment surface, the axial stop surface 319 portion of the upper end wall of the inner tube 310. The upper cap surface 402 and the axial stop surface 319 are complementary. The axial stop surface 319 provides an axial constraint for the cartridge 360 when disposed within the inner tube 310 that limits axially upward movement of the cartridge assembly within the inner tube 310. The captive sidewall portion 382 provides radial or lateral constraint for the cartridge 360 when disposed within the inner tube 310. The lowermost portion of the cartridge 360 abutment surface, the upper cap surface 402, lies in a laterally extending abutment plane A.

The seat attachment assembly 350 comprises a post head member 602, a lower seat clamp 604, a complementary upper seat clamp 606, and two fasteners 608/610, such as bolts. The post head member 602 comprises a cradle portion 612 forming at least part of its upper surface (i.e., a surface that is generally upwardly facing when the bicycle is in use) that is configured to engage with a complimentary bearing surface on the lower seat clamp 604. The cradle portion 612 can be any shape that allows for a given embodiment of the lower seat clamp 604 to engage with and rest on the cradle portion 612. The cradle portion 612 can be configured to help facilitate relative pivoting/rotation of other portions of the seat attachment assembly 350, such as the lower seat clamp 604 and upper seat clamp 606, to help accommodate a generally forward/rearward tilting of the bicycle seat relative to the inner tube 310 to suit a rider/user's preferences. In the illustrated embodiment, the cradle portion 612 forms part of a rotation perimeter 614, that is centered around the rotation axis 616. The radius of curvature of the rotation perimeter 614 is defined by the radius of curvature of the cradle portion 612.

The post head member 602 has a front mounting portion 618 that projects forwardly beyond a perimeter of the inner tube 310 side wall, and the lowermost part of the front mounting portion 618 lies in a laterally extending post head plane B. The post head plane B is disposed axially below the abutment plane A. The upper cap surface 402 and axial stop surface 319 are both positioned below the rotational perimeter 614. The upper cap surface 402 and the axial stop surface 319 are also both positioned below a recess 323.

The fastener 608/610 is used secure the seat clamp 350 assembly to the post head member 602. The lowermost part of the front fastener 608 lies in a laterally extending fastener plane C. The fastener plane C is disposed below the post head plane B. By configuring the seat post 300 to receive the cartridge tube 160 in such a manner, i.e., with the cartridge 360 being disposed further axially upward within the inner tube 310, the overall weight of the seat post 300 may be reduced.

Referring to FIGS. 24 and 25, the interior features of this example of the locking gas spring cartridge 360 are described. The spring cartridge 360 operates in an analogous manner to cartridge 160 and like features are described using like reference characters indexed by 200.

In this example, fixedly attached to sliding surface 391 are upper seal head 392 and lower seal head 393, which together help seal in the interior of the cartridge outer tube 361 and substantially fluidly isolate the interior of the cartridge outer tube 361 from the surrounding environment (at least with a sufficient degree of sealing/isolation to facilitate the operation of the locking spring cartridge 360 as described herein).

Within the interior of the cartridge outer tube 361 a piston assembly is provided to separate the interior of the cartridge outer tube 361 into two different chambers, and to help facilitate the translation of the cartridge outer tube 361 as described. The piston assembly can be of any suitable configuration that can operate as described herein. A valve mechanism is also preferably provided that can selectably allow fluid communication between the chambers on opposite sides of the piston assembly, as this can be used to lock and unlock the locking spring cartridge 360. The valve, and related fluid flow path regions, can be of any suitable configuration.

To help reduce the overall size of the locking spring cartridge 360, it may be preferable to integrate a suitable valve mechanism within the piston assembly, as is shown in the present example that includes a piston valve 394 attached to the upper end 363a of a cartridge rod 363 that can extend from the piston valve 394 to the actuator assembly 340. The piston valve 394 is sized to generally fill the cartridge outer tube 361, is positioned axially between the upper and lower cartridge seal heads 392 and 393 and has a sealing portion that is positioned opposite and configured to seal against the sliding surface 391 and includes a body-sliding-surface o-ring 398 (or other suitable translatable sealing member). The piston valve 394, in this example, also includes a valve body 395, a plunger 396 that can move relative to the valve body 395, a body-piston o-ring 397. In this embodiment the valve body 395 defines a corresponding valve body channel 395a (see also FIG. 21) and when the valve in in the unlocked position a valve inner pathway 395b (FIG. 21). The plunger 396 includes a seal surface 396a, that can seal against the valve body 395 (e.g., against o-ring 397 in this example) to inhibit fluid flow through the piston valve, and neck portion 396b.

In this arrangement, the piston 394 divides the interior of the cartridge outer tube 361 into two operating chambers that can be fluidly isolated from each other while the locking spring cartridge 360 is in use to selectably lock and unlock the locking spring cartridge 360. For example, when the operating chambers are fluidly isolated from each other the locking spring cartridge 360 can be considered to be in a locked configuration and will resist movement of the cartridge outer tube 361 and seat post inner tube 310. In contrast, when the operating chambers are fluidly connected, such as by activating the piston valve 394 and allowing fluid (liquid) to pass through the piston 394 and flow between the operating chambers, the locking spring cartridge 360 can be considered to be in an unlocked configuration and will facilitate the relative movement of the cartridge outer tube 361 and seat post inner tube 310 relative to the outer tube 320. As described herein, when the locking spring cartridge 360 is in use, and the piston valve 394 is opened/unlocked, the cartridge outer tube 361 can translate relative to the piston 394 to allow the seat post inner tube 310 to translate relative to the outer tube 320.

As described herein, a first, of the operating chambers is chamber 381, is located axially between the piston valve 394 and the lower seal head 393 and is laterally bounded by the sliding surface 391 and is configured to contain a mixture of liquid and gas or other material and can also be referred to as a liquid chamber. When the locking spring cartridge 360 is in use within the seat post 300 in the orientation illustrated in these Figures (which is also the orientation of the locking spring cartridge 360 when it is in use on a bicycle) the chamber 381 can be referred to as a lower chamber 381, but it is understood that the term lower is used for convenience and is not intended to limit the orientation of the locking spring cartridge 360 when in use.

In the present example, the other, or second, operating chamber is chamber 382 which is located axially between the piston valve 394 and the upper seal head 392 and is also laterally bounded by the sliding surface 391. Because of its relative location within the locking spring cartridge 360 as illustrated, the second chamber 382 can be referred to as an upper chamber 382. Similar to lower chamber 381, the upper chamber 382 is preferably configured to contain a mixture of oil (or other suitable liquid) and pressurized air (or other suitable gas).

Under the intended operating conditions of the locking spring cartridge 360 the oil and air (or other liquid and gas) in the gas/liquid chamber 382 with tend to separate from each other due the differences in their densities and mechanical properties, such that an air/oil interface or boundary 383 is defined. In this arrangement, depending on the position of the piston valve 394, and therefore the extension or retraction of the inner tube 310 of the dropper seat post 300, the air/oil interface or boundary 383 may be within the lower chamber 381, or the upper chamber 382. When the inner tube 310 is fully retracted, the piston valve 394 is positioned such that the volume of the lower chamber 381 may be greater than the volume of the upper chamber 382. In this configuration, the air/oil interface or boundary 383 is in the lower chamber 381. When the inner tube 310 is fully extended, the piston valve 394 is positioned such that the volume of the lower chamber 381 is less than the volume of the upper chamber 382. In this configuration, the air/oil interface or boundary 383 is in the upper chamber 382. When moving the inner tube 310 from a fully retracted to a full extended position the piston valve 394 moves through the air/oil interface or boundary 383. When the piston valve 394 is actuated and its valve is open, fluid communication between the upper chamber 382 and the lower chamber 381 is established.

When the inner tube 310 is fully retracted, the piston valve 394 is positioned such that the volume of the lower chamber 381 is greater than the upper chamber 382. The volume of the lower chamber 381 when fully retracted defines a retracted chamber volume. The retracted chamber volume is less than the volume of the locking spring cartridge 360. The volume of liquid contained within the locking spring cartridge 360 is less than the retracted volume. The volume of liquid contained within the spring cartridge 360 is between 5% and 95% of the retracted volume.

When the inner tube 310 of the dropper seat post 300 beings to retract, the piston valve 394 is submerged in the liquid and moves through the liquid. The piston valve 394 then moves through the air/oil interface or boundary 383. The piston valve 394 then moves through gas. Once the inner tube 310 is fully retracted, the piston valve 394 is surrounded by the gas. The piston valve 394 moves at a faster speed when moving through the gas. This can be characterised as drop two different drop segments. In the first drop segment the piston valve 394 moves at a slower speed when moving through the liquid. In the second drop segment the piston valve 394 moves at a faster speed when moving through the gas. Due to the properties of the liquid and the gas the piston valve 394 experiences a greater resistance to movement when moving through the liquid than when moving through the gas. This results in the different speeds in the first and second drop segments. Once fully retracted, the piston valve 394 is beyond the air/oil interface or boundary 383, and preferably is spaced below the boundary 183 by at least 5% of the length of the lower chamber 181 (when in the retracted position).

As noted herein, in the illustrated examples, the total volume of gas/air that is contained within the cartridge (including in both chambers 381 and 382) is relatively greater than would be contained in a conventional cartridge design of similar geometry but in which the lower chamber 382 only contains oil. With air on both sides of the piston, when the inner tube 310 is fully extended, opening the piston valve 394 provides fluid communication between oil on both sides of the piston and the chambers 382 and 381 will be at substantially the same pressure. When the inner tube is fully retracted, opening the piston valve 394 provides fluid communication between gas on both sides of the piston (e.g., gas within the first chamber 381 is in communication with gas within the second chamber 382). The gas is at a suitable operating pressure, which preferably can be above about 200 psi.

When the inner tube 310 moves from the extended position to the retracted position the gas within the cartridge is compressed. As the gas is compressed, its pressure increases proportionally with its amount of compression. That is, compressing the air by 10% of its volume may lead to approximately 10% increase in its pressure. Practically, this means that as the inner tube 310 is retracted the pressure within the cartridge will increase which increases the force exerted by the cartridge and that is felt and must be overcome by the user in order to retract the inner tube 310. In some conventional designs, the gas pressure within the cartridge can increase by 200%, 250% or 300% or more when the inner tube is fully retracted. This can mean the user experiences a 2-3× increase in the resistance and force required to retract the inner tube.

In contrast to such conventional designs, the relatively larger volume of gas that is contained within the cartridge assemblies described herein can mean that moving the inner tube from the fully extended to the fully retracted position may only cause less than a 20%, 30%, 40%, 50%, 60%, 70%, 80%, 90% and/or 100% decrease in the available gas volume within the cylinder—and therefore cause the pressure of the gas to increase by less than 20%, 30%, 40%, 50%, 60%, 70%, 80%, 90% and/or 100%. In this arrangement, the gas pressure when the inner tube is fully retracted may be less than 200% (or 2×) the gas pressure when the inner tube is fully extended, and may be less than 190%, 180%, 170%, 160%, 150%, 140%, 130% or about 120% of the fully extended gas pressure. This may help reduce the force that is required from a user to retract the inner tube.

For example, in the illustrated embodiment, when the inner tube 310 is fully extended the total gas volume above the oil gas boundary is larger than when the inner tube 310 is fully retracted. The ratio of the fully extended gas volume to fully retracted gas volume may be less than about 2:1, 1.9:1, 1.8:1, 1.7:1, 1.6:1, 1.5:1, 1.4:1 and 1.3:1 and preferably may be less than 1.2:1 in some examples. That is, the fully extended gas volume may be about 200%, 190%, 180%, 170%, 160%, 150%, 140%, 130% or 120% or less of the fully retracted gas volume. When fully extended the gas operating pressure is above 200 psi and preferably between 500-1000 psi. When retracted that decreased gas volume in the described example may increase the operating pressure within the cylinder by less than about 140% and optionally by less than about 120%.

That is, when the inner tube 310 is in the extended position, the locking spring cartridge 360 has a first internal gas pressure. The first internal gas pressure is optionally between 500 and 1000 psi. When the inner tube 310 is in the extended position, the locking spring cartridge 360 has a total extended volume which is the sum of the volume of oil and the volume of air in the cartridge 360. Then the inner tube 310 is in the retracted position the locking spring cartridge 360 has a second internal gas pressure. The second internal gas pressure is optionally between 650 and 1300 psi. When the inner tube 310 is in the retracted position, the locking spring cartridge 360 has a total retracted volume which is the sum of the volume of oil and the volume of compressed air. The second internal gas pressure is preferably less than 130% of the first internal gas pressure.

The second internal gas pressure in this example is lower than that of the prior art. In the prior art there is a greater relative volume of oil in the cartridge and lower relative volume of gas, and the piston travels the axial length of the cartridge 960 to compress the gas. In this example there is a lower relative volume of oil in the cartridge and a higher relative volume gas, however the piston travels the same distance (the axial length of the cartridge 360) which means that for a given physical travel distance of the piston the gas within at least some of the cylinders having the features described herein can be compressed by a smaller volume percentage than the gas in a conventional gas cartridge would be. The relatively greater volume of gas, and relatively smaller volume percentage compression, results in the piston achieving a relatively lower pressure when the cartridge 360 is in the retracted position and the gas is compressed.

In the illustrated examples of dropper post assembly 300, the wherein the spring cartridge 360 is configured as a generally sealed, independent locking spring cartridge in which the cartridge outer tube 361 is separate from the walls of the post inner tube 310. In this arrangement, the spring cartridge 360 is insertable and removable from within the post inner tube 310 in its charged/pressurized configuration and is operable independently of the inner tube 310 so that when the spring cartridge 360 is axially removable via the lower end 312 of the inner tube 310 (for example, when the second engagement member is disengaged from the tube engagement member), the spring cartridge biasing mechanism remains operable and does not need to be opened, discharged or otherwise modified. This may help simplify assembly and maintenance of the seat post assembly 300.

While this invention has been described with reference to illustrative embodiments and examples, the description is not intended to be construed in a limiting sense. Thus, various modifications of the illustrative embodiments, as well as other embodiments of the invention, will be apparent to persons skilled in the art upon reference to this description. It is therefore contemplated that the appended claims will cover any such modifications or embodiments.

All publications, patents and patent applications referred to herein are incorporated by reference in their entirety to the same extent as if each individual publication, patent, or patent application was specifically and individually indicated to be incorporated by reference in its entirety.

I claim:

1. A dropper post assembly for supporting a bicycle seat, the dropper post assembly comprising:

an outer tube extending axially along a post axis between a lower end and an upper end;

an inner tube that is axially translatable relative to the outer tube between an extended position and a retracted position, the inner tube having an interior bounded by a sidewall with a clearance portion disposed axially between an upper end that includes an inward facing axial stop surface and a lower end that is disposed within the outer tube, the clearance portion having an interior cross-sectional area taken in a lateral direction that is perpendicular to the post axis, and wherein a lowermost portion of the axial stop surface lies in a laterally extending abutment plane;

a spring cartridge assembly configurable in an unlocked configuration in which the spring cartridge assembly biases the inner tube toward its extended position and a locked configuration, and comprising:

i. a cartridge tube removably disposed within and axially translatable with the inner tube relative to the outer tube and providing an interior cylinder volume bounded by a cartridge sidewall, the cartridge tube having an upper end positioned proximate the axial stop surface and secured to the upper end of the inner tube such that relative lateral movement between the upper end of the cartridge tube and the upper end of the inner tube is inhibited, a lower end that is disposed at the lower end of the inner tube, the cartridge tube having a cartridge cross-sectional area taken in the lateral direction that is less than 90% of the interior cross-sectional area whereby a lateral gap is provided between at least some of the cartridge sidewall and the clearance portion;

ii. a piston movably received within the cylinder to provide a first chamber disposed on a lower side of the piston, and a second chamber disposed on an opposing, upper side of the piston, whereby moving the inner tube toward the retracted position expands the first chamber, the piston including a valve that is configurable in an open position in which fluid communication is established between the first chamber and the second chamber and the spring cartridge assembly is in the unlocked configuration, and a closed position in which the first chamber is fluidly isolated from the second chamber and the spring cartridge assembly is in the locked configuration;

iii. a lower seal assembly disposed at a lower end of the cartridge tube and sealing a lower end of the cylinder and a cartridge rod extending axially through the lower seal assembly between an inner end engaging the piston and an outer lower end at the lower end the outer tube;

an actuator assembly having a body disposed adjacent the outer end of the cartridge rod and being operable to actuate the valve to change the spring cartridge assembly between the locked configuration and the unlocked configuration; and a post head member disposed at the upper end of the inner tube for attaching a bicycle seat, the post head member having a front mounting portion projecting forwardly beyond a perimeter of the inner tube sidewall and comprising a front fastener aperture wherein a lowermost part of the front fastener aperture lies in a laterally extending post head plane that is disposed axially inboard from the abutment plane.

2. The dropper post assembly of claim 1, wherein further comprising a seat clamp assembly mounted to the post head member for attaching the bicycle seat and a front fastener extending through the front fastener aperture and securing the seat clamp assembly to the post head member, wherein a lowermost part of the front fastener lies in a laterally extending fastener plane that is disposed axially inboard from the abutment plane.

3. The dropper post assembly of claim 1, wherein the post head member comprises a curved cradle surface configured to rotatably support a seat clamp assembly and defining a seat rotation perimeter and a seat rotation axis, wherein the abutment plane and an uppermost portion of the cartridge tube assembly are disposed axially inboard from the seat rotation axis.

4. The dropper post assembly of claim 3, wherein the cartridge tube comprises an axially facing upper cap surface that is proximate the axial stop surface when the cartridge tube is disposed within the inner tube and wherein the upper cap surface and axial stop surface are complimentary to each other and generally planar.

5. The dropper post assembly of claim 3, wherein the uppermost portion of the cartridge tube assembly is disposed axially between the seat rotation axis and the seat rotation perimeter.

6. The dropper post assembly of claim 3, wherein the upper most portion of the cartridge tube assembly is disposed axially inboard from the seat rotation perimeter.

7. The dropper post assembly of claim 1, wherein the clearance portion has a length that extends at least 30% of an axial length of the inner tube.

8. The dropper post assembly of claim 1, wherein the upper end of the cartridge tube is sealed and the cartridge tube and the lower seal assembly are removable together from the inner tube whereby the first chamber and second chamber remain sealed when the cartridge tube is removed from the inner tube and cartridge assembly remains operable independently of the inner tube.

9. The dropper post assembly of claim 1, wherein the inner tube comprises an upper captive portion having a captive cross-sectional area taken in the lateral direction and wherein the cartridge cross-sectional area is more than 90% of the captive cross-sectional area so that the upper end of the cartridge tube is closely received in the upper captive portion thereby inhibiting lateral movement between the upper end of the cartridge tube and the upper end of the inner tube.

10. The dropper post assembly of claim 9, wherein the upper end of the cartridge tube is not connected to the upper end of the inner tube in a manner that prevents axial removal of the upper end of the cartridge tube from the upper captive portion.

11. The dropper post assembly of claim 9, wherein the upper end of the inner tube comprises an upper tube engagement member and the cartridge tube comprises an axial engagement member that is removably connected to upper tube engagement member to axially secure the cartridge tube to the inner tube.

12. The dropper post assembly of claim 11, wherein the upper tube engagement member comprises a first threaded portion of the inner tube and the axial engagement member comprises a complimentary second threaded portion whereby the cartridge tube threadingly engages the inner tube.

13. The dropper post assembly of claim 1, further comprising a lower engagement member disposed toward the lower end of the inner tube and substantially filling the lateral gap thereby inhibiting relative lateral movement between the lower end of the cartridge tube and the inner tube.

14. A dropper post assembly for supporting a bicycle seat, the dropper post assembly comprising:
an outer tube extending axially along a post axis between a lower end and an upper end;
an inner tube that is axially translatable relative to the outer tube between an extended position and a retracted position, the inner tube having an interior bounded by a sidewall having a clearance portion disposed axially between an upper end and a lower end that is disposed within the outer tube, the clearance portion having an interior cross-sectional area taken in a lateral direction that is perpendicular to the post axis;
a spring cartridge assembly configurable in an unlocked configuration in which the spring cartridge assembly biases the inner tube toward its extended position and a locked configuration, and comprising:
a) a cartridge tube removably disposed within and axially translatable with the inner tube relative to the outer tube and providing an interior cylinder volume bounded by a cartridge sidewall, the cartridge tube having an upper end secured to the upper end of the inner tube such that relative lateral movement between the upper end of the cartridge tube and the upper end of the inner tube is inhibited, a lower end that is disposed at the lower end of the inner tube, the cartridge tube having a cartridge cross-sectional area taken in the lateral direction that is less than 90% of the interior cross-sectional area whereby a lateral gap is provided between at least some of the cartridge sidewall and the clearance portion;
b) a piston movably received within the cylinder to provide a first chamber disposed on a lower side of the piston, and a second chamber disposed on an opposing, upper side of the piston, whereby moving the inner tube toward the retracted position expands the first chamber, the piston including a valve that is configurable in an open position in which fluid communication is established between the first chamber and the second chamber and the spring cartridge assembly is in the unlocked configuration, and a closed position in which the first chamber is fluidly isolated from the second chamber and the spring cartridge assembly is in the locked configuration;
c) a lower seal assembly disposed at a lower end of the cartridge tube and sealing a lower end of the cylinder and a cartridge rod extending axially through the lower seal assembly between an inner end engaging the piston and an outer lower end at the lower end the outer tube;
an actuator assembly having a body disposed adjacent the outer end of the cartridge rod and being operable to actuate the valve to change the spring cartridge assembly between the locked configuration and the unlocked configuration;
a post head member disposed at the upper end of the inner tube for attaching a bicycle seat; and
a lower engagement member disposed toward the lower end of the inner tube and substantially filling the lateral gap thereby inhibiting relative lateral movement between the lower end of the cartridge tube and the inner tube.

15. The dropper post assembly of claim 14, wherein the lower engagement member is axially insertable into the lower end of the inner tube or is integrally formed with the inner tube.

16. The dropper post assembly of claim 14, wherein the lower engagement member is disposed entirely within the interior of the inner tube.

17. The dropper post assembly of claim 14, wherein the cartridge tube is axially translatable relative to the lower engagement member and is axially insertable into and removable from the inner tube while the lower engagement member is installed.

18. The dropper post assembly of claim 14, wherein the lower engagement member comprises a clip that is partially received within a complimentary groove formed in the inner tube sidewall.

19. The dropper post assembly of claim 14, wherein the lower end of the inner tube comprises a lower tube engagement member and wherein the lower engagement member comprises a second engagement member configured to releasably engage the lower tube engagement member and an axially extending captive sidewall whereby when the lower engagement member is inserted the captive sidewall is disposed laterally between the lower end of the cartridge tube and the inner tube sidewall.

20. The dropper post assembly of claim 19, wherein the lower engagement member further comprises a lower abutment surface, and wherein when the lower engagement member is inserted with the second engagement member engaging the lower tube engagement member the cartridge tube is retained axially between the lower abutment surface and the axial stop surface, whereby relative axial movement between the cartridge tube and the inner tube is inhibited.

21. The dropper post assembly of claim 20, wherein the captive sidewall extends axially from the abutment surface and cooperates with the abutment surface to at least partially define a tube recess sized to accommodate the lower end of the cartridge tube, wherein when the lower engagement member is inserted the lower end of the cartridge tube is nested within the tube recess.

22. The dropper post assembly of claim 20, wherein the upper end of the cartridge tube does not include a fastening mechanism for restricting the axial movement of the cartridge tube relative to the inner tube.

23. The dropper post assembly of claim 19, wherein the lower tube engagement member and the second engagement member comprise complimentary threads.

24. The dropper post assembly of claim 14, wherein the upper end of the inner tube includes an inward facing axial stop surface and a lowermost portion of the axial stop surface lies in a laterally extending abutment plane, and wherein the post head member comprises a front mounting portion projecting forwardly beyond a perimeter of the inner tube sidewall and comprising a front fastener aperture wherein a lowermost part of the front fastener aperture lies in a laterally extending post head plane that is disposed axially inboard from the abutment plane.

25. The dropper post assembly of claim 14, wherein the cartridge cross-sectional area is less than 85% of the interior cross-sectional area.

26. A dropper post assembly for supporting a bicycle seat, the dropper post assembly comprising:
an outer tube extending axially along a post axis between a lower end and an upper end;
an inner tube that is axially translatable relative to the outer tube between an extended position and a retracted position, the inner tube having an interior bounded by a sidewall with a clearance portion disposed axially between an upper end that includes an inward facing axial stop surface and a lower end that is disposed within the outer tube, the clearance portion having an interior cross-sectional area taken in a lateral direction that is perpendicular to the post axis, and wherein a lowermost portion of the axial stop surface lies in a laterally extending abutment plane;
a spring cartridge assembly configurable in an unlocked configuration in which the spring cartridge assembly biases the inner tube toward its extended position and a locked configuration, and comprising:
 a) a cartridge tube removably disposed within and axially translatable with the inner tube relative to the outer tube and providing an interior cylinder volume bounded by a cartridge sidewall, the cartridge tube having an upper end positioned proximate the axial stop surface, a lower end that is disposed at the lower end of the inner tube, the cartridge tube having a cartridge cross-sectional area taken in the lateral direction that is less than 90% of the interior cross-sectional area whereby a lateral gap is provided between at least some of the cartridge sidewall and the clearance portion;
 b) a piston movably received within the cylinder to provide a first chamber disposed on a lower side of the piston, and a second chamber disposed on an opposing, upper side of the piston, whereby moving the inner tube toward the retracted position expands the first chamber, the piston including a valve that is configurable in an open position in which fluid communication is established between the first chamber and the second chamber and the spring cartridge assembly is in the unlocked configuration, and a closed position in which the first chamber is fluidly isolated from the second chamber and the spring cartridge assembly is in the locked configuration;
 c) a lower seal assembly disposed at a lower end of the cartridge tube and sealing a lower end of the cylinder and a cartridge rod extending axially through the lower seal assembly between an inner end engaging the piston and an outer lower end at the lower end the outer tube;
an actuator assembly having a body disposed adjacent the outer end of the cartridge rod and being operable to actuate the valve to change the spring cartridge assembly between the locked configuration and the unlocked configuration;
a lower engagement member disposed toward the lower end of the inner tube and substantially filling the lateral gap thereby inhibiting relative lateral movement between the lower end of the cartridge tube and the inner tube; and
a post head member disposed at the upper end of the inner tube for attaching a bicycle seat, the post head member having a front mounting portion projecting forwardly beyond a perimeter of the inner tube sidewall and comprising a front fastener aperture wherein a lowermost part of the front fastener aperture lies in a laterally extending post head plane that is disposed axially inboard from the abutment plane.

27. The dropper post assembly of claim 26, wherein the upper end of the cartridge tube is secured to the upper end of the inner tube such that relative lateral movement between the upper end of the cartridge tube and the upper end of the inner tube is inhibited.

* * * * *